(12) United States Patent
Dias et al.

(10) Patent No.: US 8,304,468 B2
(45) Date of Patent: Nov. 6, 2012

(54) POLYMERS COMPRISING THIOESTER BONDS

(75) Inventors: Aylvin Jorge Angelo Athanasius Dias, Maastricht (NL); Mark Johannes Boerakker, Eindhoven (NL); Atze Jan Nijenhuis, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 11/991,016

(22) PCT Filed: Sep. 7, 2006

(86) PCT No.: PCT/EP2006/008730
§ 371 (c)(1),
(2), (4) Date: Aug. 20, 2008

(87) PCT Pub. No.: WO2007/028612
PCT Pub. Date: Mar. 15, 2007

(65) Prior Publication Data
US 2009/0156707 A1 Jun. 18, 2009

(30) Foreign Application Priority Data
Sep. 7, 2005 (EP) .................................... 05108206

(51) Int. Cl.
*C08J 3/28* (2006.01)
*C08G 63/68* (2006.01)
*C08G 63/688* (2006.01)

(52) U.S. Cl. ........ 522/104; 522/180; 528/360; 528/364; 528/374; 528/376

(58) Field of Classification Search .................. 522/168, 522/180, 146, 104, 127, 142; 528/376, 360; 525/92 J
See application file for complete search history.

(56) References Cited

U.S. PATENT DOCUMENTS

| 6,350,812 | B1 * | 2/2002 | Vert et al. ....................... 524/845 |
| 6,908,963 | B2 * | 6/2005 | Roberts et al. ................ 525/54.1 |
| 7,008,571 | B2 * | 3/2006 | Higuchi et al. ................. 264/1.1 |
| 7,847,019 | B2 * | 12/2010 | David et al. .................... 525/54.1 |
| 2003/0144373 | A1 | 7/2003 | Bowman |
| 2003/0236371 | A1 | 12/2003 | Wilson et al. |
| 2007/0155926 | A1 * | 7/2007 | Matyjaszewski et al. . 526/303.1 |

OTHER PUBLICATIONS

International Search Report for PCT/EP2006/008730 mailed Nov. 30, 2006.
Written Opinion of the International Searching Authority for PCT/EP2006/008730.
Kobayashi et al., "Synthesis of New Linear Polymers containing Thiocarbonyl Groups: Polyaddition of Dicarbothioic Acid to Diolefins," *Polymer Journal, Society of Polymer Science*, (1994), pp. 49-59.
Kobayashi et al., "Kinetics of the Addition Reactions of Thiobenzoic Acids to Styrenes or Ethynlybenzenes as the Model of Polyaddition. Study on the Rate-Determining Step and Substituent Effect," *Polymer Journal, Society of Polymer Science*, (1993) pp. 507-520.
Marvel et al., "Polythiolesters," *Journal of the American Chemical Society*, (1951), pp. 1100-1102.

* cited by examiner

*Primary Examiner* — Susan W Berman
(74) *Attorney, Agent, or Firm* — Nixon & Vanderhye P.C.

(57) ABSTRACT

This invention is in the field of polymer chemistry. More in particular it provides a method to produce polymers such as block copolymers or cross-linked networks that are suitable for medical applications. The invention also provides degradable materials that may degrade completely when used in the human or animal body, minimizing residual components that may be toxic or otherwise undesirable.

10 Claims, 13 Drawing Sheets

POLYMERS COMPRISING THIOESTER BONDS

Figure 1:
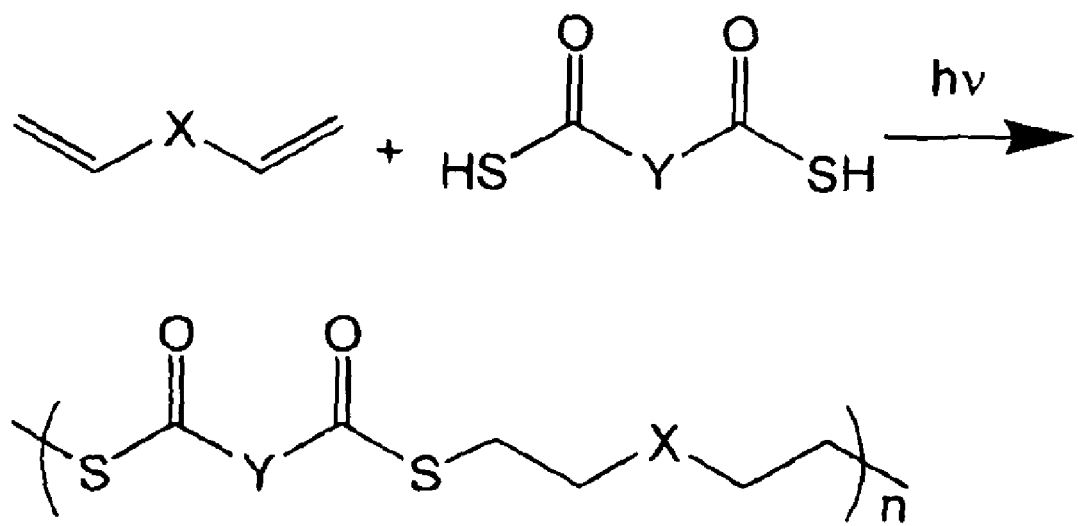

This application is the U.S. national phase of International Application No. PCT/EP2006/008730, filed 7 Sep. 2006, which designated the U.S. and claims priority to European Patent Application No. 05108206.3, filed 7 Sep. 2005, the entire contents of each of which are hereby incorporated by reference.

This invention is in the field of polymer chemistry. More in particular it provides a method to produce polymers such as block copolymers or cross-linked networks that are suitable for medical applications. The invention also provides degradable materials that may degrade completely when used in the human or animal body, minimizing residual components that may be toxic or otherwise undesirable. All materials foreign to the body have the potential risk to illicit a (late) foreign-body response once in contact with the human body. The finite exposure time of degradable materials significantly decreases the risk of late foreign body responses. As the infections associated with a surgical implant often require the removal of the implant, the advantages of the use of degradable materials are significant.

Biocompatible polymers have been used extensively in therapeutic drug delivery and medical implant device applications. Sometimes, it is also desirable for such polymers to be not only biocompatible, but also degradable or even biodegradable to obviate the need for removing the polymer once its therapeutic value has been exhausted. E.g. a resorbable stent allows restenting in cases where restenosis occurs.

Conventional methods of drug delivery, such as frequent periodic dosing, are not ideal in many cases. For example, with drugs that have a small difference between a maximum desired level and a toxic level, frequent conventional dosing can result in high initial drug levels at the time of dosing, often at near-toxic levels, followed by low drug levels between doses that can be below the level of their therapeutic value. However, with controlled drug delivery, drug levels can be more easily maintained at therapeutic, but non-toxic, levels by controlled release in a predictable manner over a longer term.

If a degradable medical device is intended for use as a drug delivery or other controlled-release system, using a polymeric carrier is one effective means to deliver the therapeutic agent locally and in a controlled fashion, see Langer et al., "Chemical and Physical Structures of Polymers as Carriers for Controlled Release of Bioactive Agents", J. Macro. Science, Rev. Macro. Chem. Phys., C23:1, 61-126 (1983). As a result, less total drug is required, and toxic side effects can be minimized. Furthermore the device made from this degradable polymer could be used in much more invasive medical procedures where removal of a drug delivery depot is a concern.

Polymers have been used as carriers of therapeutic agents to allow a localized and sustained release. See Leong et al., "Polymeric Controlled Drug Delivery", Advanced Drug Delivery Reviews, 1:199-233 (1987); Langer, "New Methods of Drug Delivery", Science, 249:1527-33 (1990); and Chien et al., Novel Drug Delivery Systems (1982). Such delivery systems offer the potential of enhanced therapeutic efficacy and reduced overall toxicity.

For a non-degradable matrix, the steps leading to release of the therapeutic agent are dispersion and diffusion of the therapeutic agent out through the channels of the matrix or from its surface.

Since many pharmaceuticals have short half-lives, therapeutic agents can decompose or become inactivated within the non-degradable matrix before they are released. This issue is particularly significant for many bio-macromolecules and smaller polypeptides, since these molecules are generally hydrolytically unstable and have low permeability through a polymer matrix. In fact, in a non-degradable matrix, many bio-macromolecules aggregate and precipitate rendering them inactive.

Using a degradable or biodegradable matrix that, in addition to some diffusion release, also allows controlled release of the therapeutic agent by degradation of the polymer matrix alleviates these problems. Examples of classes of synthetic polymers that have been studied as possible degradable materials include polyesters (Pitt et al., "Biodegradable Drug Delivery Systems Based on Aliphatic Polyesters: Application to contraceptives and Narcotic Antagonists", Controlled Release of Bioactive Materials, 1944 (Richard Baker ed., 1980); poly(amino acids) and pseudopoly(amino acids) (Pulapura et al., "Trends in the Development of Bioresorbable Polymers for Medical Applications", J. of Biomaterials Appl., 6:1, 216-50 (1992); polyurethanes (Bruin et al., "Biodegradable Lysine Diisocyanate-based Poly(Glycolide-co-ECaprolactone)—Urethane Network in Artificial Skin", Biomaterials, 11:4, 291-95 (1990); polyorthoesters (Heller et al., "Release of Norethindrone from Poly(OrthoEsters)", Polymer Engineering Sci., 21:11, 727-31 (1981); and polyanhydrides (Leong et al., "Polyanhydrides for Controlled Release of Bioactive Agents", Biomaterials 7:5, 364-71 (1986).

Specific examples of degradable or biodegradable materials that are used as medical implant materials are polylactide, polyglycolide, polydioxanone, poly(lactide-co-glycolide), poly(glycolide-co-polydioxanone), polyanhydrides, poly(glycolide-co-trimethylene carbonate), and poly(glycolide-co-caprolactone). Other examples that may be used as degradable or biodegradable or bioresorbable polymers in medical implants or devices are polyphosphazenes, poly(propylene)fumarates, poly(trimethylene carbonates), polyesteramides, poly(ε-caprolactones), poly(hydroxy acids), polyurethanes, poly(anhydrides), polycarbonates, polyaminocarbonates, polypeptides, polyoxaesters, poly(maleic acids), polyorthoesters, poly((polyethyleneoxide)-co-poly(butyleneterephtalate)), as well as the biologically derived polymers, e.g. polyhydroxyalkanoates, carbohydrates or poly(saccharides), such as hyaluronic acid, polysucrose, dextran and derivatives thereof, heparin, heparan sulfate, collagen, gelatin, fibrin, chitin, chitosan, albumin, carboxymethylcellulose, hydroxyalkylated cellulose, starch. In addition, many blends and copolymers may be used.

Degradable materials may also be advantageously employed in e.g. orthopedic, dermal, surgical, dental, cranial-maxillofacial, neural, mucosal or vascular applications. Products comprising such degradable materials may be screws, pins, plates, stents, adhesives, anti-adhesives, sealants, patches, meshes, sponges, gels, waxes, vascular grafts, films, coatings, tissue engineering scaffolds, matrices for the controlled delivery of drugs or materials for sutures.

U.S. Pat. No. 6,060,582 describes polymeric materials that may be used in controlled release of drugs or as a tissue sealant after or during surgical procedures. It provides hydrogels of polymerized and cross-linked macromers, prepared from hydrophilic oligomers having degradable monomeric or oligomeric extensions, which degradable extensions are terminated on their free ends with end cap monomers or oligomers capable of polymerization and cross-linking. Oligomers are polymerized using free radical initiators under the influence of long wavelength ultraviolet light, visible light excitation or thermal energy. Degradation occurs at linkages within the extension oligomers and results in fragments, which are asserted to be non-toxic and easily removed from the body.

However, the degradation products of the polymeric materials described in U.S. Pat. No. 6,060,582 inherently include poly(ethylene glycol) and/or poly(acrylic acid). The latter polymer, which is essentially non-degradable, is inherent to any acrylate cross-link technology. Depending on their structure and their molecular weight, polymers may accumulate in the body and depending on the site of implantation they may accumulate in certain organs or tissue or cause side effects. Molecules that are non-degradable and non-excretable are not preferred for applications in the animal or human body.

Further drawback of the technology described in U.S. Pat. No. 6,060,582 is that the chemistry requires the use of separate photoinitiators that can be cytotoxic at relatively low concentrations. Moreover, the technology is best suited for thin films, since thick samples of the materials are difficult to polymerize because of light attenuation by the initiator or by the polymerising composition. Further disadvantages are the inhibition of radical polymerization by oxygen present in air and the lack of ability to form gels with a high water content while maintaining high mechanical strength.

WO 03/031483 discloses degradable thiol-ene polymers. Many of the drawbacks of acrylate chemistry have been overcome by using thiol-ene chemistry. There is no need for photoinitiators, hence no light attenuation by photoinitiators can occur and there is also no oxygen inhibition. Moreover, thiol-ene polymerisation is faster than acrylate polymerisation (WO 04/101649) In addition, a broader range of ethylenically unsaturated groups can be used for thiol-ene polymerisation than for acrylate polymerisation obviating the need for acrylates, which are often irritant and/or sensitising. The thiol-ene chemistry also does not yield any poly(acrylic acid) upon degradation. Disadvantage of the thiol-ene chemistry, however, is that thioethers are formed upon cross-linking. The disadvantage of such thioethers is that they are not readily broken down in the body and require the use of oxidative enzymes. There are very few natural thioethers in the body and they are either based on methionine or substituted cysteines.

Most of these disadvantages again, are alleviated by the technology disclosed in US Patent Application 200210165337 A1, which discloses degradable thioester crosslinked systems obtained in a condensation reaction of thiols with activated esters. The disadvantage of that technology, however, is the release of low molecular weight elimination products, such as succinimide or succinimide-like condensation products which may be toxic. In particular, most of the exemplified reactions in US Patent Application 2002/0165337 A1 produce N-hydroxysuccinimide as an elimination product in in situ applications where crosslinking is done in contact with biological tissue. The elimination products may interfere with drug release behaviour when the application demands drug delivery.

Furthermore, activated esters as the ones exemplified in US 2002/0165337 A1 are known to inactivate thrombin, presumably by reacting with the amine groups of the lysine residues, thereby interfering with the activity of the thrombin. Additionally, the technology as described in US 2002/0165337 A1 allows the user only a limited process time after the reactive components are mixed together.

The Japanese patent application JP 63 092648 to Kuraray Co Ltd. of 23 Apr. 1988 discloses the synthesis of polyethers having mercapto groups on its terminal ends.

US patent application US 2002/071822 A1 to Uhrich discloses polymers such as polythioesters which degrade hydrolytically into biologically active compounds and methods for their production.

WO 2004/083266 discloses an alternative process for the synthesis of polythioesters wherein monomers are used that already contain a thioester group. The resulting polymer is shown to be hydrolysable at the thioester linkage.

US 2002/106764 A1 to Steinbuchel et al., discloses a method to produce polythioesters through a fermentation process.

Surprisingly, a new method has now been found to produce a hydrolysable polymer comprising thioester bonds. This method avoids the generation of unwanted elimination products and leaves no toxic or non-metabolisable degradation products upon hydrolysis.

In one aspect, the invention relates to a method of making a polymer comprising thioester bonds, said method comprising the steps of forming a composition by admixing a component X comprising at least one ethylenically unsaturated group with a component Y comprising at least two thioic acids, and wherein X and/or Y is an oligomer or a polymer and allowing the components to form at least two thioester bonds.

In a further aspect, the invention relates to a method of making a polymer comprising thioester bonds, said method comprising the steps of forming a composition by admixing a component X comprising at least one ethylenically unsaturated group with a component Y comprising at least two thioic acids, wherein X and/or Y is a monomer, oligomer or polymer and wherein at least one of the components X or Y is an oligomer or a polymer and allowing the components to form at least two thioester bonds.

The polymers obtained by the method according to the invention are hydrolysable by virtue of the fact that the thioester bond is hydrolysable. In a particularly advantageous application, components X and/or Y themselves are also degradable preferably biodegradable, even more preferably metabolizable.

In a preferred embodiment of the present invention, both components X and Y are oligomers or polymers. In that way, particularly useful properties may be given to the resulting polymer and the polymerization behaviour of the components boundary conditions for compositions for branched, non-gelled polymers as reported by Durand and Bruneau (D. Durand, C.-M. Bruneau, Makromol. Chem. 1982, 183, 1007-1020 and in D. Durand, C.-M. Bruneau, The British Polymer Journal, 1979, 11, 194-198; D. Durand, C.-M. Bruneau, The British Polymer Journal 1981, 13, 33-40; D. Durand, C.-M. Bruneau, Polymer, 1982, 23, 69-72; D. Durand, C.-M. Bruneau, Makromol. Chem., 1982, 183, 1021-1035; D. Durand, C.-M. Bruneau, Polymer, 1983, 24, 587-591).

For the production of particularly useful crosslinked polymers or networks, it is required that the composition comprising components X and Y fulfils the boundary conditions for compositions for crosslinked polymers or networks as reported by Durand and Bruneau (D. Durand, C.-M. Bruneau, Makromol. Chem. 1982, 183, 1007-1020 and in D. Durand, C.-M. Bruneau, The British Polymer Journal, 1979, 11, 194-198; D. Durand, C.-M. Bruneau, The British Polymer Journal 1981, 13, 33-40; D. Durand, C.-M. Bruneau, Polymer, 1982, 23, 69-72; D. Durand, C.-M. Bruneau, Makromol. Chem., 1982, 183, 1021-1035; D. Durand, C.-M. Bruneau, Polymer, 1983, 24, 587-591).

Components X and Y may be based on the same oligomer or polymer, however, when they are based on different oligomers or polymers, the properties of the resulting polymer comprising thioester bonds and distribution of active components such as drugs may be controlled more effectively and the reaction can be steered in a more controllable way.

The polymers obtained by a method according to the invention have the advantageous property that they can be degraded hydrolytically or enzymatically. When the components X and Y are also degradable or biodegradable, a polymer may be synthesized that can be degraded more completely with no residues left. When the components X and Y are even completely degradable or biodegradable, a polymer may be synthesized that can be degraded without leaving any residual components. This makes the polymers obtained by the method of the invention particularly useful for the manufacture of medical devices, such as stents, screws, sutures, plates, pins, adhesives, anti-adhesives, sealants, patches, meshes, sponges, gels, waxes, vascular grafts, films, cell delivery vehicles, coatings, polymer-based medicinal products, tissue engineering scaffolds, matrices for the controlled delivery of drugs or materials for sutures. It also makes the polymers obtained by the present invention particularly suited for tissue engineering or surgery such as dental surgery. They may also be used in controlled release systems or drug delivery systems such as drug-eluting stents or may be carefully steered.

In an alternative embodiment, component Y is dithio adipic acid. This molecule was found particularly useful to construct degradable polymers when component X was an oligomer or a polymer.

The method according to the invention requires the reaction of components X and Y. Such reaction, which may be a polymerization, may be induced by light, in particular UV light, but may also be induced by heat such as body heat, or occur spontaneously. When light, in particular UV, is used for the reaction, this may require the presence of a photoinitiator.

The properties of a polymer may be influenced by the degree of cross-linking. This may be achieved by choosing appropriate chain lengths of the components X and Y. Alternatively, the degree of cross-linking may be influenced by choosing an appropriate number of ethylenically unsaturated groups in component X and/or thioic acid groups in component Y. In another alternative the degree of cross-linking may be influenced by preventing the polymerization to go to completion, i.e. by preventing the highest degree of reaction to occur. Preferably, however, the reaction proceeds to the highest degree of reaction. A partial reaction may be especially desirable when it is required to have some residual reactive groups in the cross-linked matrix, for instance for modifications after cross-linking, such as attaching functional groups or covalent attachment to tissue or other biological material.

For the production of particularly useful linear polymers it may be advantageous that component X comprises a maximum of 2 ethylenically unsaturated groups and that component Y comprises a maximum of 2 thioic acid groups. The minimum average ethylenically unsaturated groups and thioic acid groups per component is advantageously larger than 1.2.

For the production of particularly useful crosslinked polymers or networks, it is required that component X comprises at least 2 ethylenically unsaturated groups and that component Y comprises at least 2 thioic acid groups and that the number of ethylenically unsaturated groups plus thioic acid groups is more than 4.

For the production of particularly strong crosslinked polymers or networks, it is required that component X comprises at least 3 ethylenically unsaturated groups and/or that component Y comprises at least 3 thioic acid groups and that the number of ethylenically unsaturated groups plus thioic acid groups is more than 5.

For the production of particularly useful branched, non-gelled polymers, it is required that the composition comprising components X and Y fulfils the other drug-eluting devices such as catheters. In addition, the polymers according to the invention may be used as surgical sealants, adhesives or anti-adhesives.

The method according to the invention and the polymers obtained by that method may be particularly suited for tissue engineering processes since the method may be applied in situ, taking advantage of the fact that the formation of the thioester bond does not produce any elimination products. The release of migratable small organic molecules as elimination products upon polymerisation is not preferred for in situ application. An example of an undesired elimination product in an in vivo application is the production of N-hydroxy succinimide as an elimination product as described in US patent application 2002/0165337 A1, which, apart from being toxic, may crystallize or interfere with the release of drugs when the application demands drug delivery. An example of an undesired elimination product in an ex vivo application is the production of water as an elimination product during a convential polycondensation reaction, which limits the molecular weight that can be obtained.

When a method according to the invention is applied to obtain a polymer, that polymer will thus advantageously not contain any elimination products. The invention therefore also relates to a degradable or biodegradable polymer or composition comprising at least two thioester bonds which polymer or composition comprises essentially no elimination products.

The invention also relates to a medical device comprising a polymer comprising at least two thioester bonds.

As used herein, the term "degradable" refers to a material having a molecular structure, which can decompose to smaller molecules. Such degradation or decomposition can be by various chemical mechanisms. For example, a degradable polymer can be hydrolytically degradable in which water reacts with the polymer to form two or more molecules from the polymer by chemical bonds in the molecule being hydrolyzed, thus producing smaller molecules. Many so-called degradable polymers are not completely degradable and have to be excreted, which puts strain on the kidneys and the renal system.

In a particularly advantageous embodiment of the present invention, the materials or components are biodegradable. Biodegradable polymers are materials that experience accelerated degradation by the action of biological agents present in their environment such as bacteria and fungi. In particular, however, biodegradability refers to an accelerated degradation, either by hydrolysis or by the action of an enzyme. Such may be attributable to a microorganism and/or it may occur in the body of an animal or a human.

Tissue compatible, water-insoluble materials that turn water-soluble under physiological conditions without regard of mechanism involved during erosion are often referred as bioerodible polymers.

Materials that experience loss of substance through cellular activity (e.g. phagocytosis) are often referred to as bioresorbable or bioabsorbable polymers.

As used herein, the term "macromolecule" or "polymer" or "polymer molecule" means a molecule of high relative molecular mass, the structure of which essentially comprises the multiple repetition of units derived, actually or conceptually, from molecules of low relative molecular mass. Such polymers may include crosslinked networks, branched polymers and linear polymers. It is to be noted that in many cases, especially for synthetic polymers, a molecule can be regarded as having a high relative molecular mass if the addition or removal of one or a few of the units has a negligible effect on the molecular properties. This statement fails in the case of certain macromolecules for which the properties may be critically dependent on fine details of the molecular structure. It is also to be noted that, if a part or the whole of the molecule has a high relative molecular mass and essentially comprises the multiple repetition of units derived, actually or conceptually, from molecules of low relative molecular mass, it may be described as either macromolecular or polymeric, or by polymer used adjectivally. In general, polymers have a molecular weight of more than 8000 Da, such as more than 10,000, 12,000, 15,000, 25,000, 40,000, 100,000 or more than 1,000,000 Da.

As used herein, the term "block" refers to a portion of a macromolecule, comprising many constitutional units that has at least one feature which is not present in the adjacent portions. Where appropriate, definitions relating to 'macromolecule' may also be applied to 'block'.

As used herein, the term "block macromolecule" means a macromolecule which is composed of blocks in linear sequence.

As used herein, the term "block polymer" means a polymer composed of block macromolecules.

As used herein, the term "constitutional unit" means an atom or group of atoms (with pendant atoms or groups, if any) comprising a part of the essential structure of a macromolecule, an oligomer molecule, a block or a chain.

As used herein, the term "oligomer molecule" means a molecule of intermediate relative molecular mass, the structure of which essentially comprises a small plurality of units derived, actually or conceptually, from molecules of lower relative molecular mass. It is to be noted that a molecule is regarded as having an intermediate relative molecular mass if it has properties which do vary significantly with the removal of one or a few of the units. It is also to be noted that, if a part or the whole of the molecule has an intermediate relative molecular mass and essentially comprises a small plurality of units derived, actually or conceptually, from molecules of lower relative molecular mass, it may be described as oligomeric, or by oligomer used adjectivally. In general, oligomers have a molecular weight of more than 200 Da, such as more than 400, 800, 1000, 1200, 1500, 2000, 3000, 4000, or more than 8000 Da.

As used herein, the term "copolymer" refers to a polymer derived from more than one species of monomer. It is to be noted that copolymers that are obtained by copolymerization of two monomer species are sometimes termed bipolymers, those obtained from three monomers terpolymers, those obtained from four monomers quaterpolymers, etc.

As used herein, the term "monomer" or "monomer molecule" refers to a substance that can undergo polymerization thereby contributing constitutional units to the essential structure of a macromolecule.

As used herein, the term "polymerization" refers to the process of converting a monomer or a mixture of monomers or an oligomer or a mixture of oligomers into a polymer.

As used herein, the term "block copolymer" refers to a copolymer that is a block polymer. In the constituent macromolecules of a block copolymer, adjacent blocks are constitutionally different, i.e. adjacent blocks comprise constitutional units derived from different species of monomer or from the same species of monomer but with a different composition or sequence distribution of constitutional units.

Components X and Y can be chemically diverse these components X and Y may both be degradable however one of the components may be partially degradable or non degradable. This is often utilised where an additional property as well as degradability is required. In the case of degradable components, X and/or Y can be selected from poly(lactide) (PLA), polyglycolide (PGA), co-oligomers or copolymers of PLA and PGA (PLGA), poly(anhydrides), poly(trimethylenecarbonates), poly(orthoesters), poly(dioxanones), poly($\epsilon$-caprolactones) (PCL), poly(urethanes), polyanhydrides, poly (hydroxy acids), polycarbonates, polyaminocarbonates, polyphosphazenes, poly(propylene)fumarates, polyesteramides, polyoxaesters, poly(maleic acids), polyacetals, polyketals, starch, and natural polymers such as polypeptides, polyhydroxyalkanoates, fibrin, chitin, chitosan, polysaccharides or carbohydrates such as polysucrose, hyaluronic acid, dextran and similar derivatives thereof, heparan sulfate, chondroitin sulfate, heparin, or alginate, and proteins such as gelatin, collagen, albumin, or ovalbumin, or co-oligomers or copolymers, or blends thereof. In particularly preferred embodiments, X and/or Y can be selected from poly (lactide) (PLA), poly(anhydrides), poly(trimethylenecarbonates, poly (dioxanones), poly($\epsilon$-caprolactones) (PCL), poly(lactide-co-glycolide) or co-oligomers or copolymers or blends thereof.

In the case where non degradable components are required for an additional property like hydrophilicity, hydrophobicity, mechanical strength and/or non fouling properties, components X and/or Y may be selected from the group consisting of poly(vinyl alcohol) (PVA), poly(ethylene oxide), poly(ethylene oxide)-co-poly(propylene oxide) block co-oligomers or copolymers (poloxamers, meroxapols), poloxamines, poly (urethanes), poly((polyethyleneoxide)-co-poly(butyleneterephtalate)), poly(vinyl pyrrolidone), poly(ethyl oxazoline), carboxymethyl cellulose, hydroxyalkylated celluloses such as hydroxyethyl cellulose and methylhydroxypropyl cellulose.

Particularly good non fouling properties were achieved when using poly(ethylene oxide) as components X and/or Y.

Particularly good amphiphilic behaviour was achieved when components X and/or Y were selected from the group consisting of poly(ethylene oxide)-co-poly(propylene oxide), poloxamers, poloxamines and meroxapols.

Particularly good mechanical strength was achieved when using poly(urethanes as components X and/or Y.

Particularly good hydrophilicity was achieved when components X and/or Y were selected from the group consisting of poly(vinyl pyrrolidone) and poly (ethyl oxazoline).

In a method according to the invention, multiple components X and/or components Y may be used. Components X as well as components Y may consist of different oligomers or polymers. For instance, a method according to the invention may be performed with two or more components X that may be independently selected, for instance from the group of oligomers or polymers detailed above. An example of such a method is provided in Example 9f. Also, a method according to the invention may be performed with two or more components Y that may be independently selected, for instance from the group of oligomers or polymers detailed above.

Components X and Y may vary in molecular weight depending upon which properties are desired for the resulting polymeric material. More particularly, the molecular weight for X and Y may range from about 28 Da to more than about 50000 Da. Prior to formation of the polymeric material of the present invention, X and Y are derivatized to include thioic acid groups or ethylenically unsaturated groups such that they can participate in thioic-ene polymerisation (FIG. 1). For use in in situ applications, the components X and Y are preferably of higher molecular weight. Preferably, low molecular weight components are to be avoided for this application since unreacted monomers could migrate out of the resulting polymer and may cause unwanted side effects, e.g. through co-elution with drugs they may influence the drug release.

The method according to the invention yields polymers comprising thioester bonds. Such polymers are known in the art and a large variety of methods for their preparation have been described; for instance in C. S. Marvel, JACS 1951, 73, 1100-1102; C. Berti, *Macromolecules* 1990, 23, 3505-3508; M. A. Abd-Alla, High Performance Polymers 1990, 2, 235-243; W. Podkoscielny, J. Appl. Polym. Sci. 1993, 47, 1523-1531; T. Kim, J. Am. Chem. Soc. 1995, 117, 3963-3967; W. Choi, J. Polym. Sci.: Part A: Polymer Chemistry 1998, 36, 1189-1195; M. Al-Masri, J. Macromol. Sci. Pure Appl. Chem. 2001, A38, 1007-1017: R. C. Schmeltzer, Biomacromolecules 2005, 6, 359-367; E. Kobayashi, Polymer Journal 1994, 26, 49-59; H. Kricheldorf, Macromol. Chem. Phys. 1998, 199, 273-282; F. Sanda, J. Appl. Polym. Sci.: Part A: Polymer Chemistry 2000, 38, 4057-4061; H. Buehrer, Advances in Chemistry Series 1973, 129, 105-130; H. Kricheldorf, Macromolecules 1989, 22, 14-20; A. Kameyama, Macromolecules 1997, 30, 6494-6497; K. Komura, *Macromol. Chem. Phys.* 2002, 203, 931-936; S. Iwata, Macromol. Rapid. Commun. 2003, 24, 467-471; K. Kobashi, Polymer 2004, 45, 7099-7107; J. Kawada, Biomacromolecules 2003, 4, 1698-1702; Y. Doi, Nature Materials 2002, 1, 207-208 and in G. A. Nyssen, Chemtech 1978, 546-550.

Such methods have also been the subject of a number of patents and patent applications, such as WO 2004/007575 A1; U.S. Pat. No. 3,538,043, U.S. Pat. No. 3,755,268, U.S. Pat. No. 4,245,084, U.S. Pat. No. 2,727,018 and WO 98/34596.

From these, only Marvel and Kotch (J. Amer. Chem. Soc. 73, 1100-1102 (1951) and Kobayashi et al., Polymer Journal, 26, 49-59 (1994) and Polymer Journal, 25 507-520 (1993) describe a technology wherein components comprising ethylenically unsaturated groups are reacted with components comprising thioic acid groups.

Marvel and Kotch describe the preparation of polythioesters of the type [SCORCOS—R']$_x$ from a variety of dibasic chlorides and aliphatic dithiols or from the addition of dibasic thio acids (dithio adipic acid, dithiopimelic acid, dithio suberic acid, dithioazelic acid, dithio sebacic acid, dithio terephtalic acid, dithio isophtalic acid) to the non-conjugated diolefin biallyl (1,5-hexadiene) using UV light.

Kobayashi et al., describe the reaction mechanism of the addition reaction of thiobenzoic acid to styrene or ethynylbenzene using UV light or radical initiators (AIBN) in Polymer Journal, 25, 507-520 (1993) and the polyaddition of 1,4-benzenedicarbothioic acid to 1,4-divinylbenzene or 1,4-diisopropenylbenzene in Polymer Journal, 26, 49-59 (1994).

It is to be noted that the starting components used by Marvel and Kotch as well as those used by Kobayashi et al. do not qualify as oligomers or polymers.

By virtue of the fact that only relatively small molecules have been used so far as the reactants to form polythioesters, the resulting prior art polymers are characterised by the fact that they contain a relatively high number of thioester groups per unit molecular weight of the polymer obtained. For instance, the polymers described by Marvel and Kotch comprise relatively small fragments between 2 thioester bonds; the heaviest fragment described is a fragment ($C_{10}H_{12}$) with a weight of 132 Da. Kobayashi et al. describe a polymer wherein such heaviest fragment ($C_{12}H_{16}$) has a weight of 160 Da.

In contrast to the prior art described above, the present invention is concerned with a particular method of reacting at least two components X and Y into a polymer so that thioester bonds are formed, wherein at least one of the components is an oligomer or a polymer. In that way particularly useful polymers may be obtained that have advantageous properties such as biodegradability and solubility and other mechanical and chemical properties that that are not accessible through the use of starting components of relatively low molecular weight.

Figure 13:
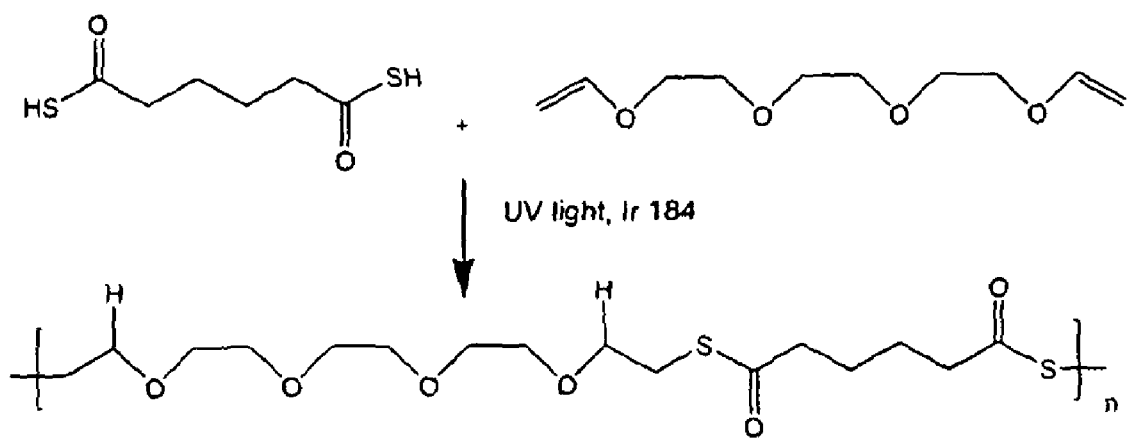

The polymers obtainable by the present invention are characterised by the fact that they contain at least one relatively large fragment between 2 thioester groups. For example, in the present invention such a fragment has a weight of at least 200 Da. An example of a reaction that results in a polymer wherein the weight of the fragment between 2 thioester groups is 204 Da ($C_{10}H_{20}O_4$) is shown in FIG. 13. Advantageously, however, the polymers contain at least a fragment with a weight of 250, 300, 350, 400, 450, 500, 600, 800, 1000, 1500, 2000 or more between 2 thioester bonds.

The average molecular weight of the polymers obtained by the method according to the invention can be influenced by adjusting the ratio of thioic acid groups to ethylenically unsaturated groups in the composition and the degree of reaction. The higher the excess of either one of the two functionalities, the lower the average molecular weight of the polymers obtained and the more this functionality will be present in the final polymer product. This is a very sensitive mechanism, since small differences in the molar ratios of thioic acid groups to ethylenically unsaturated groups may result in large differences in molecular weight of the polymer obtained (see example 9d).

The components used in a method of the present invention may be obtained commercially or by methods known in the art. The examples provide guidance for the synthesis and use of particularly useful components comprising ethylenically unsaturated groups as well as components comprising at least two thioic acid groups. In particular the exemplified components dithio adipic acid (DTAA), triethyleneglycol divinyl ether (TEGDVE) poly(lactide-co-glycolide)1200di(4-pentenoate) (PLGDP), poly(lactide-co-glycolide)2600-tri(4-pentenoate) (PLGTP), poly(ε-caprolactone)2100di(4-pentenoate) (PCLDP), tris[(6-oxo-6-sulfanylhexanoyl)oxy]poly(lactide-co-glycolide)2000 (PLGTTA), α,ω-bis[(6-oxo-6-sulfanylhexanoyl)oxy]poly(lactide-co-glycolide)1300 (PLGDTA), 6-{2,3-bis[(6-oxo-6-sulfanylhexanoyl)oxy]propoxy}-6-oxohexanethioic S-acid (GTTA) and PEG11500tetra(4-pentenoate) (PEG4P) provided advantageous results in that useful degradable polymers were obtained.

One of the components that may be used in a method according to the invention is characterised in that it comprises an ethylenically unsaturated group. Instead of ethylenically unsaturated groups, a strained ring structure may be used in a method according to the invention. In particular strained ring structures having a hetero atom capable of reacting with an organic acid are preferred, e.g. oxiranes, oxetanes, thiiranes, dioxolanes.

Components comprising ethylenically unsaturated groups are available commercially. Such components may be any suitable molecule having a carbon-carbon double bond. For example, the ethylenically unsaturated group may be selected from a group consisting of vinyl, alkyne, alkene, vinyl ether, vinyl sulphones, vinylphosphates, allyl, acrylate, acrylamide, fumarate, maleate, itaconate, citraconate, mesaconate, methacrylate, maleimide, isoprene, and norbornene and derivatives thereof such as esters and amides. Cyclic structures may also be used.

The second type of component that may be used in a method according to the invention is characterised in that it comprises at least two thioic acid groups. The thioic acid groups may be aliphatic or aromatic thioic acids. A thioic acid group is herein defined as a chemical group having a structure according to formula 1.

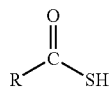

Formula 1

The ratio aromatic and aliphatic thioic acids may influence the polymer properties, such as degradation or biodegradation, mechanical properties and hydrophilicity and drug solubility and release. When the ratio of aromatic to aliphatic thioc acids increases, the resulting polymer is likely to be more hydrophobic, and have a higher mechanical strength. Conversely, when the ratio of aromatic to aliphatic thioc acids decreases, the resulting polymer is likely to be more hydrophilic, and have a lower mechanical strength. Depending on which drug is to be incorporated into the polymer and its desired release time, the hydrophobicity may thus be adjusted to provide the optimal environment for a given drug and its release. It should be noted that a thioic acid as shown in formula 1 is in fact an equilibrium between the following two structures, as described in W. Bauer, K. Kuehlein, in *Carboxylic Acids and Carboxylic Acid Derivatives*; J. Falbe, Ed.; Methoden Der Organischen Chemie (Houben-Weyl); Georg Thieme Verlag: Stuttgart, Germany, 1985, Vol. E5, p. 832.

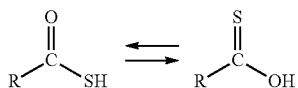

The method according to the invention may also be used to produce block polymers or block co-polymers. In this case, at least one of the components advantageously consists of an oligomer or a polymer. Such an oligomer or polymer may comprise an ethylenically unsaturated group and/or comprise thioic acids. In that latter case, a method according to the invention may be defined as the use of an oligomer or a polymer comprising at least two thioic acid for the synthesis of a block polymer or a block co-polymer.

The thioester bonds may be formed in a method according to the invention employing a wide variety of mechanisms. Light and heat may be suitable agents, however, the reaction may also occur spontaneously. The skilled person knows that a wide variety of catalysts, thermal initiators, photoinitiators and stabilizers may be used to influence the speed and extent of the reaction. When used for in situ application in the human or animal body, a blue light or visible light source may be particularly advantageous. Alternatively a spontaneous reaction may be advantageous.

It will be appreciated by the skilled person that the temperature of the reaction provides a powerful tool to steer the speed and selectivity of the reaction. Also, the concentration of the reactants will determine the speed of the reaction and the properties of the polymers obtained.

In case a cross-linked polymer is desired, the properties of the network obtained may be influenced by varying the length of the oligomer or polymer components. Alternatively, the degree of cross-linking may be influenced by choosing an appropriate number of ethylenically unsaturated groups in component X and/or thioic acid groups in component Y. Network properties are also determined by the characteristics and nature of the oligomer or polymer components. For instance, a thioester polymer degrades faster when hydrophilic components X and Y are used, whereas hydrophobic components are used if the thioester polymer should be degradable over a longer period of time such as weeks, months or even years.

The choice of the components X and Y also influences the network density of the resulting polymer. In order to obtain longer interchain distances, longer chain lengths may be used for the components X and Y or monofunctional components may be added to the composition. Alternatively, components X and Y may comprise a higher number of ethylenically unsaturated groups and thioic acid groups, respectively, such as 3, 4, 5, 6, 7, 8 or more than 8. Alternatively, components X and Y may be used in non-equimolar quantities such as 1,5:1, 2:1, 4:1 or more than 8:1. A skilled person will know how to influence network density and other physical parameters of polymers.

Figure 2:
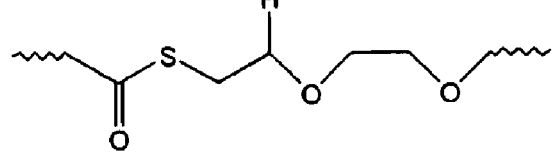
Figure 2:
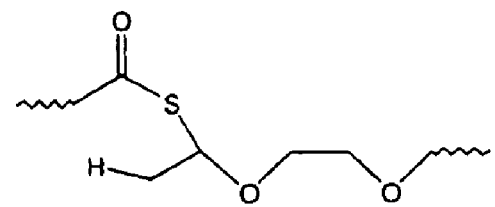

In the method according to the invention, two types of thioester bonds may be generated, the ratio of which may influence the polymer properties, such as degradation or biodegradation. It was observed that polymers according to the invention contained thioester bonds obtained through Markownikoff as well as through anti-Markownikoff addition reactions. Furthermore, it was observed that photochemically obtained polymers exhibited predominantly the anti-Markownikoff addition product, whereas polymers obtained thermally in the dark predominantly exhibited the Markownikoff addition product. Examples of Markownikoff and anti-Markownikoff polymers thus obtained are shown in the formulas of FIG. 2.

More in general, the thioester bonds that occur in the polymers obtainable by a method according to the invention may be represented by formula 2 or formula 3.

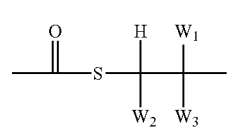

Formula 2

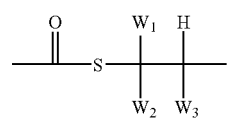

Formula 3

W1, W2 and W3 in formula 2 and 3 are selected from the group consisting of C, H, O, N, S, P, alkyl, aryl, ester and ether.

If W=H, then crystallisation is more likely to occur. In some applications this is to be avoided, since this may negatively influence biodegradability, drug distribution and release. Therefore it is preferred that W1, W2 and W3 are selected from the group consisting of C, O, N, S, P, alkyl, aryl, ester and ether.

A polymer according to the present invention may also contain a fragment according to formula 4, wherein W1, W2 and W3 are selected from the group consisting of H, C, O, N, S, P, alkyl, aryl, ester and ether, and wherein R can be of low molecular weight (such as $C_4H_8$, $C_2H_4$, etc.) or can be an oligomer or polymer, and wherein m and n are integers the sum of which indicates the number of thioester linkers connected to R and wherein the sum of m and n is at least 2.

Formula 4

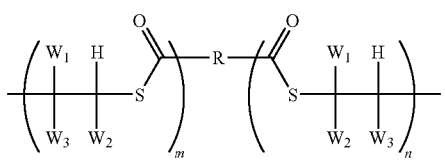

If W=H, then crystallisation is more likely to occur. In some applications this is to be avoided, since this may negatively influence biodegradability, drug distribution and release. Therefore it is preferred that W1, W2 and W3 are selected from the group consisting of C, O, N, S, P, alkyl, aryl, ester and ether, and wherein R may be of low molecular weight (such as $C_4H_8$, $C_2H_4$, etc.) or may be an oligomer or polymer, and wherein m and n are integers the sum of which indicates the number of thioester linkers connected to R and wherein the sum of m and n is at least 2.

The polymers according to the invention were found to be hydrolysable. Some of them were also found to be biodegradable. Depending on the particular kind of oligomer or polymer used as a component in the method according to the invention, degradability of the resulting polymer may be influenced. For instance, polymers based on non-degradable triethyleneglycol divinyl ether (TEGDVE) showed lower degradation rates when compared to polymers based on degradable components X comprising ethylenically unsaturated groups, such as components poly(lactide-coglycolide)1200di(4-pentenoate) (PLGDP) or poly(lactide-co-glycolide)2600-tri(4-pentenoate) (PLGTP). Hydrophobic component poly(ε-caprolactone)2100di(4-pentenoate) (PCLDP) was designed to degrade over years.

Particularly suited for applications in the human or animal body, such as in situ applications, are polymers that can be degraded into degradation products without leaving any residual components. Such degradation products are then preferably non-toxic. The degradation products may be assimilated in the human or animal metabolism, or excreted.

LEGENDS TO THE FIGURES

FIG. 1: An example of a UV light-induced thioic-ene polymerization, in which either X or Y is a polymer. The polymer displayed shows only the result of additions that occurred in an anti-Markownikoff addition reaction.

FIG. 2: Anti-Markownikoff (left) and Markownikoff (right) addition products obtained by the reaction between TEGDVE and dithioadipic acid.

Figure 3:
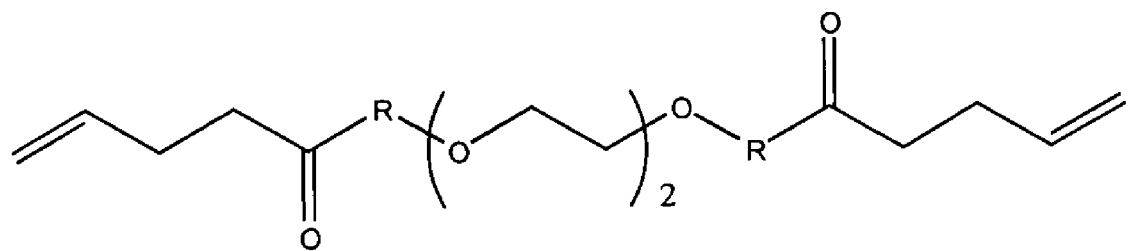

FIG. 3: PLGDP: Poly(lactide-co-glycolide)1200di(4-pentenoate). R=a lactide-coglycolide oligomer.

Figure 4:
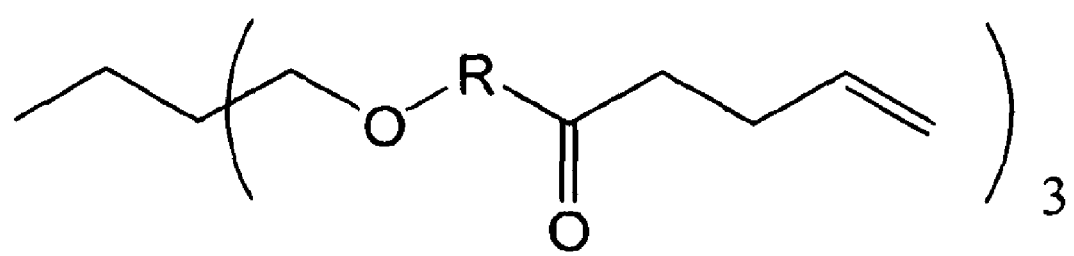

FIG. 4: PLGTP: Poly(lactide-co-glycolide)2600-tri(4-pentenoate). R1 is a lactide-co-glycolide oligomer.

Figure 5:
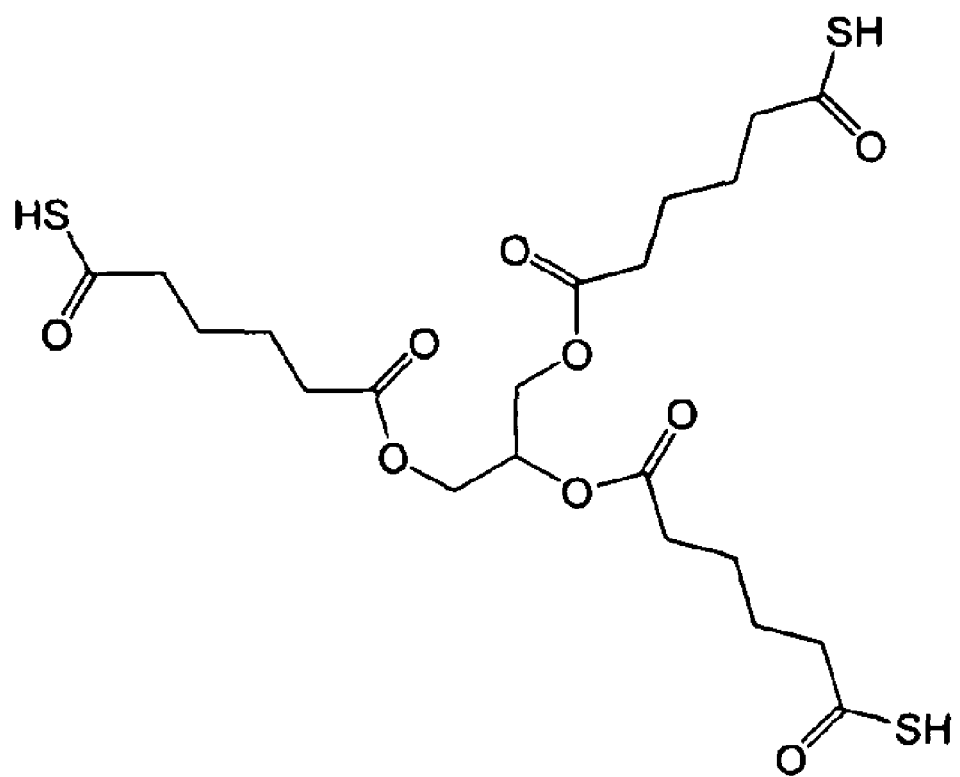

FIG. 5: GTTA: 6-{2,3-bis[(6-oxo-6-sulfanylhexanoyl)oxy]propoxy}-6-oxohexanethioic S-acid.

Figure 6:
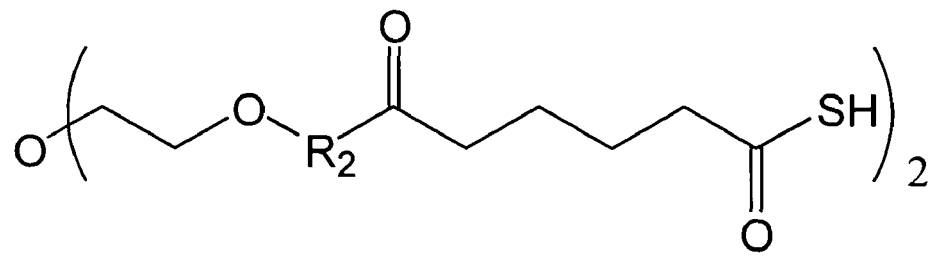

FIG. 6: PLGDTA: α,ω-bis[(6-oxo-6-sulfanylhexanoyl)oxy]poly(lactide-co-glycolide)1300. R2 is a lactide-co-glycolide oligomer.

Figure 7:
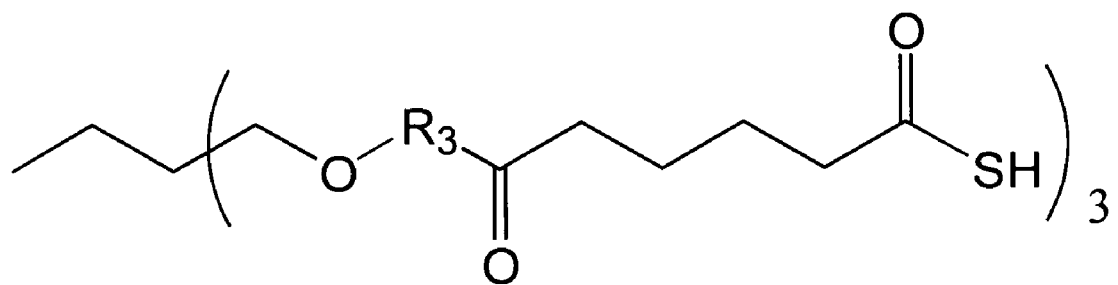

FIG. 7: PLGTTA: tris[(6-oxo-6-sulfanylhexanoyl)oxy]poly(lactide-co-glycolide)2000. R3 is a lactide-co-glycolide oligomer.

Figure 8:
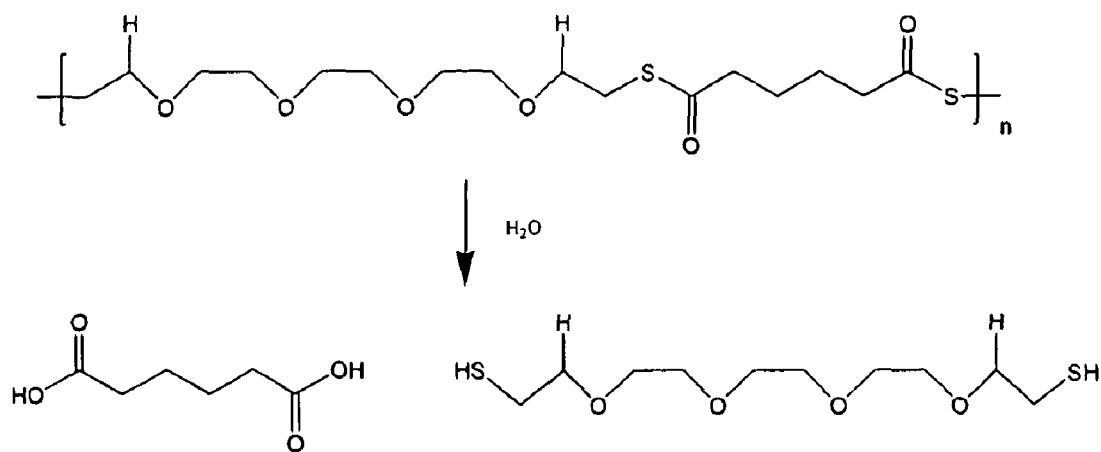

FIG. 8: Hydrolytic degradation products of the polymer obtained upon polymerization of DTAA with TEGDVE through an anti-Markownikoff addition reaction. The hydrolysis of a thioester bond is thermodynamically more favorable than that of an oxygen ester because the double-bond character of C—O bond does not extend significantly to the C—S bond.

Figure 9:
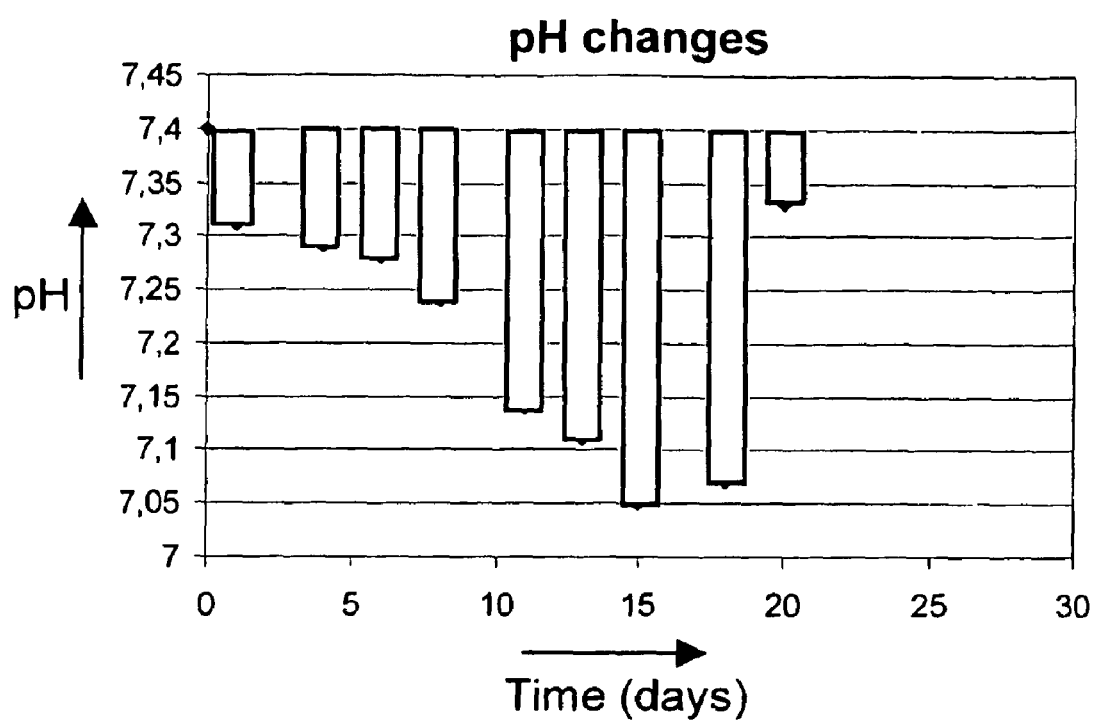

FIG. 9: pH of replaced buffer solution during the hydrolytic degradation of a sample of a polymer obtained after UV polymerization of composition E.

Figure 10:
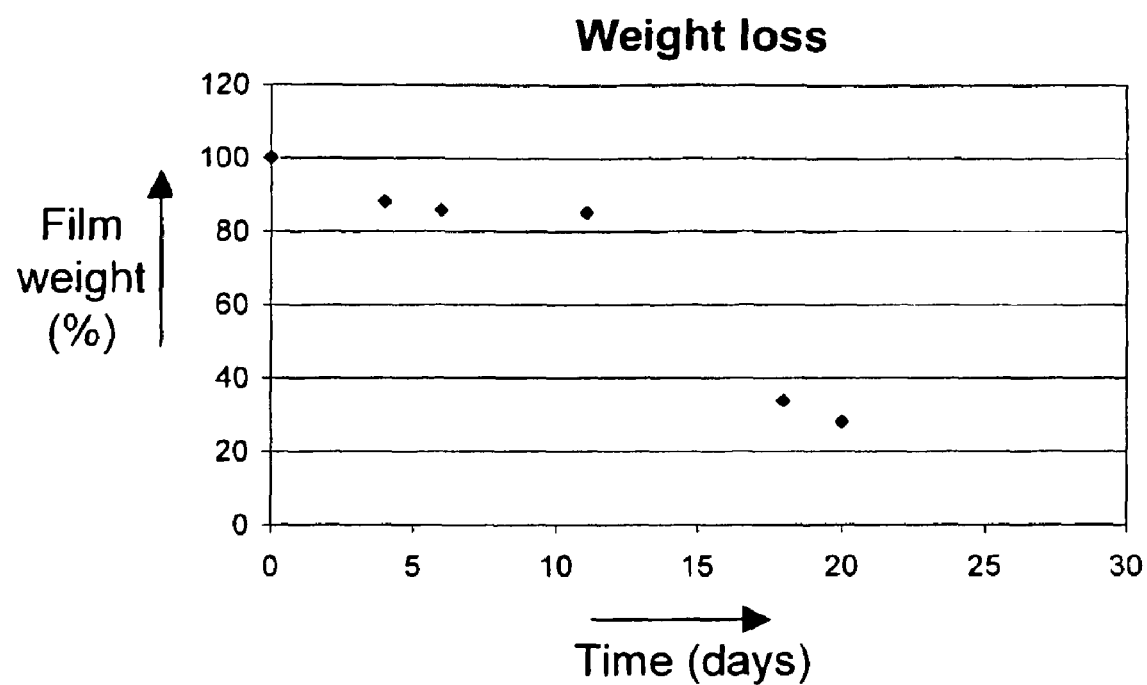

FIG. 10: Weight loss during the hydrolytic degradation of a sample of a polymer obtained after UV polymerization of composition E.

Figure 11:
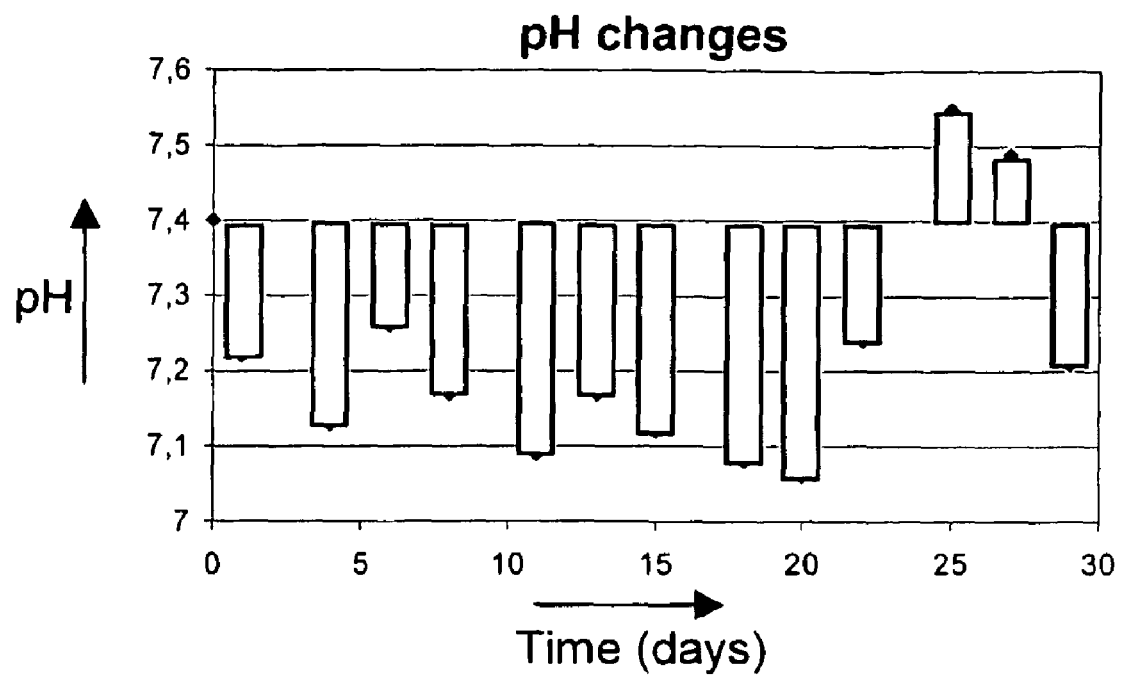

FIG. 11: pH of replaced buffer solution during the enzymatic degradation of a sample of a polymer obtained after UV polymerization of composition E.

Figure 12:
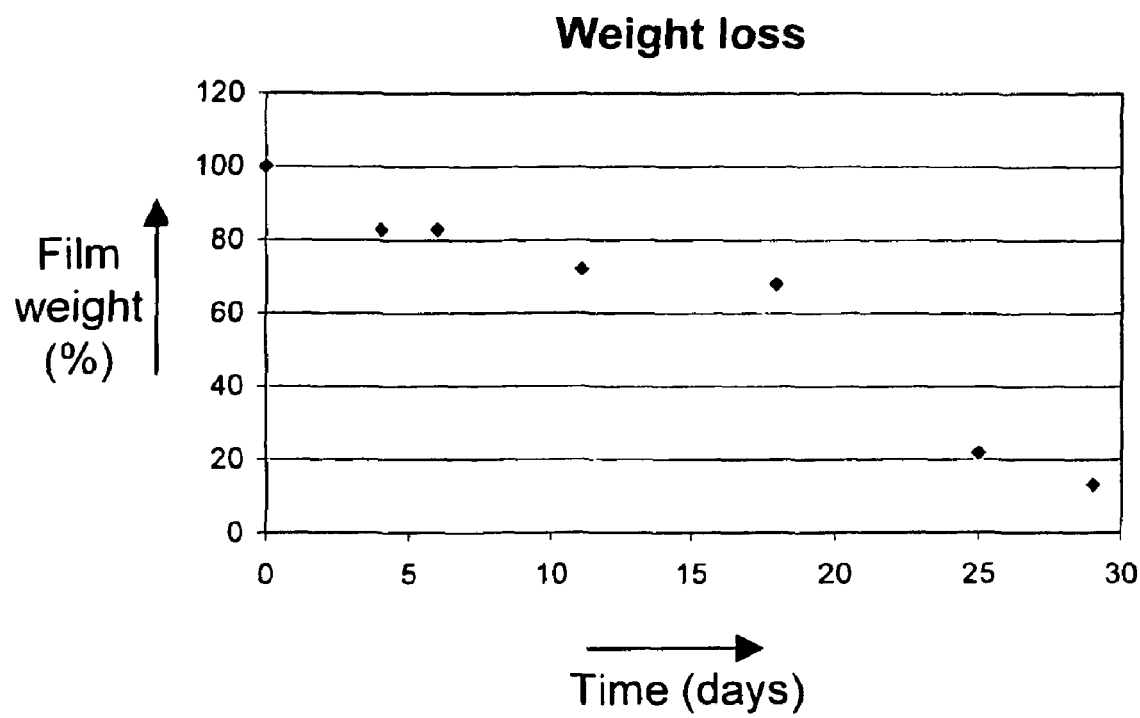

FIG. 12: Weight loss during the enzymatic degradation of a sample of a polymer obtained after UV polymerization of composition E.

FIG. 13: Reaction between components DTAA and TEGDVE to obtain a polymer comprising thioester bonds. The polymer displayed shows only the result of additions that occurred in an anti-Markownikoff addition reaction.

EXAMPLES

Example 1

Materials and Methods

Hydroxyl terminated four-arm PEG (MW 10.000) was obtained from Nektar, Huntsville, Ala. Diethyeleneglycol was distilled prior to use. Trimethylolpropane was recrystallized from ethyl acetate prior to use. Compositions were prepared in dark brown glassware.

Nuclear Magnetic Resonance (NMR) experiments were performed on a Varian Inova 300 and Bruker AM-400 spectrometers, Fourier Transform-Infrared (FT-IR) experiments were performed on a Perkin Elmer Spectrum One spectrometer fitted with a single bounce diamond Attenuated Total Reflection (ATR) crystal. Size Exclusion Chromatography (SEC) was performed using a Waters 515 HPLC pump, a Waters 410 Differential Refractometer and a Severn Analytical SA6503 Programmable Absorbance Detector equipped with a Waters styragel HR 2, 3 and 4 column at a flow rate of 1 ml/min using tetrahydrofuran (THF) as the eluent. SEC data shown herein were obtained using the UV detector unless stated explicitly that the RI detector was used. The system was calibrated using narrow polystyrene standards (EasyCal PS2, batch# PS2-19 from Polymer Laboratories, Heerlen). Liquid Chromatography-Diode Array Detection-Electron Spray-Mass spectrometry (LC-DAD-ES(+)-MS) was performed using THF as the eluent using PEG4000 as a referent.

UV-doses were determined using a EIT UV Power Puck Model PP2000 (EIT Instrumentation Products, Sterling, Va., USA).

Oligomers are presented herein for instance as poly(lactide-co-glycolide)XXXXdiol with XXXX being the molecular weight of the oligomer as determined by integration of the corresponding $^1$H-NMR spectrum.

Example 2

UV Polymerization

Compositions were applied onto glass plates using a doctor blade (200 μm). Samples were then polymerized under nitrogen atmosphere using UV-light (Fusion F600 D-bulb with a dose of 8 J/cm$^2$).

Example 3

Degradation Studies

Glass cover slips were dried overnight at room temperature in vacuo and weighed. Samples were prepared by applying polymers to the cover slips, either as a viscous liquid or as a THF solution. Samples were then dried in vacuo overnight at room temperature. The samples were weighed before and after drying. For hydrolytic degradation studies samples were placed in 10 ml of phosphate buffered saline (PBS: pH 7.4, 0.2 g/l KCl, 0.2 g/l $KH_2PO_4$, 8 g/l NaCl, 1.15 µl $Na_2PO_4$). For enzymatic degradation studies proteinase K (0.2 mg/ml) was added to the PBS solution. Solutions were refreshed every 2-3 days and the pH was monitored. Degradation of the polymer was determined by monitoring the weight loss of the samples. This was done by removing the samples from the PBS solution, washing them 3 times with distilled water, drying them in vacuo at room temperature overnight and subsequently weighing them.

Example 4

Procedure for In Vitro Cytotoxicity Tests

The biological reactivity of a mammalian monolayer, L929 mouse fibroblast cell culture, in response to the test item extract was determined. Extracts were prepared by incubating the samples in cell culture medium at 37±1° C. for 24 hours in a humidified atmosphere containing 5±1% carbon dioxide. Positive (natural rubber) and negative (silicone) control articles were prepared to verify functioning of the test system. The maintenance medium on the cell cultures was replaced by the extracts of the test item or control article in triplicate and the cultures were subsequently incubated for 48 hours at 37±1° C., in a humidified atmosphere containing 5±1% carbon dioxide.

Biological reactivity was rated on the following scale: Grade 0 (no reactivity), Grade 1 (slight reactivity), Grade 2 (mild reactivity), Grade 3 (moderate reactivity), Grade 4 (severe reactivity). The test item is considered non-cytotoxic if none of the cultures exposed to the test item show greater than mild reactivity (Grade 2). This procedure conforms with ISO norm 10993-5.

Example 5a

Components Comprising at Least One Ethylenically Unsaturated Group: Triethyleneglycol Divinyl Ether Triethyleneglycol divinyl ether (TEGDVE) was purchased from Aldrich and used without further purification.

Example 5b

Components Comprising at Least One Ethylenically Unsaturated Group: Synthesis of Poly(lactide-co-glycolide)1200di(4-pentenoate) (PLGDP)

The degradable oligomer poly(lactide-co-glycolide) 1200di(4-pentenoate) (PLGDP, FIG. 3) was synthesized via poly(lactide-co-glycolide)1100diol. Thereto, 49.54 g (340.34 mmol) of di-lactide, 39.87 g (340.34 mmol) of glycolide and 10.62 g (100 mmol) of diethyleneglycol were melted at 150° C. 500 µl of a hexane solution containing 27.8 mg of tindioctoate was added. The reaction was allowed to proceed for 24 h upon which the reaction mixture was cooled to room temperature to obtain the product. Yield: 98% as a slight yellow oil. The formation of poly(lactide-co-glycolide) 1100diol was validated with the following analytical results: $^1$H-NMR (300 MHz, $CDCl_3$, 22° C., TMS): δ (ppm)=5.2-55.18 (m, 5.6H, CH (lac)); 4.83-4.74 (m, 11.5H, $CH_2$(gly)); 4.30 (m, 6.7H, —(C=O)$OCH_2CH_2O$—, —O(C=O) $CH_2OH$, —O(C=O)CH($CH_3$)OH); 3.70 (m, 4H, —(C=O) $OCH_2CH_2O$—); 2.79 (broad, 2H, —OH); 1.58 (m, 19.9H, $CH_3$(lac)); SEC (R1 detector): $M_w$=1900, PDI: 2.02.

Next, poly(lactide-co-glycolide)1100diol (30 g, 28 mmol) was dissolved in THF (300 ml), triethylamine (10.9 ml, 78 mmol) was added and the reaction mixture was cooled to 0° C. upon which pentenoylchloride (7.94 ml, 72 mmol) was added and the temperature was maintained at 0° C. for 1 h. The mixture was left to stir at room temperature. Next, the reaction mixture was stirred for 20 min at 0° C. to precipitate the triethylamine hydrochloride salts formed during the reaction. The mixture was filtered and concentrated in vacuo. The residue was redissolved in chloroform and extracted with saturated aqueous NaCl solution and distilled water. The organic layer was dried over $Na_2SO_4$ and the solvent was removed under vacuum. Yield 81% as a yellow oil.

The formation of poly(lactide-co-glycolide)1200di(4-pentenoate) was validated with the following analytical results: $^1$H-NMR (300 MHz, $CDCl_3$, 22° C., TMS): δ (ppm)=5.84 (m, 2H, —CH=$CH_2$); 5.23-5.00 (m, 10.5H, —CH=$CH_2$ and CH (lac)); 4.86-4.65 (m, 13.5H, $CH_2$(gly)); 4.31 (m, 4H, —(C=O)$OCH_2CH_2O$—); 3.69 (m, 4H, —(C=O) $OCH_2CH_2O$—); 2.57-2.41 (m, 8H, —(C=O)$CH_2CH_2$— and —(C=O)$CH_2CH_2$—); 1.57 (m, 21.3H, $CH_3$(lac)); $^{13}$C-NMR (75 MHz, $CDCl_3$, 22° C.): δ (ppm)=172.4-166.4, 136.5, 115.6, 69.5-68.6, 66.7, 64.3, 61.1-60.2, 33.1, 28.6, 16.7; IR (neat, $cm^{-1}$): 1743.4 (C=O, stretch), 1641.6 (C=C); SEC (RI detector): $M_w$=1900, PDI: 1.42.

Example 5c

Components Comprising at Least One Ethylenically Unsaturated Group: Synthesis of Poly(ε-caprolactone)2100di(4-pentenoate) (PCLDP)

Poly(ε-caprolactone)2000di(4-pentenoate) (PCLDP) was prepared by first drying hydroxyl end-functionalized poly(ε-caprolactone)1900diol (PCL diol, available from Aldrich) overnight under reduced pressure. Next, PCL diol was dissolved in THF and triethylamine was added. The mixture was cooled down to 0° C. and 4-pentenoyl chloride was added in a dropwise manner in a molar ratio of 2.2:1 for pentenoylchloride to PCL diol. The mixture was stirred for 1 hour at 0° C. and subsequently stirred at 30° C. for 15-20 hours. The mixture was filtered to remove triethylamine hydrochloride salts and the resulting filtrate was dropped in cold methanol to obtain the product.

The formation of poly(ε-caprolactone)di(4-pentenoate) was validated with the following analytical results: $^1$H-NMR (300 MHz, $CDCl_3$, 22° C., TMS): δ (ppm)=5.82 (m, 2H, —CH=$CH_2$); 5.05 (m, 4H, —CH=$CH_2$); 4.23 (m, 4H, —(C=O)$OCH_2CH_2O$—); 4.05 (m, 30.9H, —$OCH_2CH_2CH_2CH_2CH_2$(C=O)—); 3.70 (m, 4H, —(C=O)$OCH_2CH_2O$—); 2.49-2.27 (m, 40.1H, —(C=O) $CH_2CH_2CH$=$CH_2$—, —(C=O)$CH_2CH_2CH$=$CH_2$— and —$OCH_2CH_2CH_2CH_2CH_2$(C=O)—)); 1.72-1.57 (m, 62.5H, —$OCH_2CH_2CH_2CH_2CH_2$(C=O)—); 1.40 (m, 31.7H, —$OCH_2CH_2CH_2CH_2CH_2$(C=O)—); SEC (R1 detector): $M_w$=3500, PDI: 2.52.

Example 5d

Components Comprising at Least One Ethylenically Unsaturated Group: Synthesis of Poly(lactide-co-glycolide)2600-tri(4-pentenoate) (PLGTP)

The degradable oligomer poly(lactide-co-glycolide)2600-tri(4-pentenoate) (PLGTP, FIG. 4) was synthesized via poly(lactide-coglycolide)2400-triol. Thereto, 15.07 g (104.56 mmol) of dl-lactide, 12.26 g (105.63 mmol) of glycolide and 1.84 g (13.71 mmol) of trimethylolpropane were melted at 150° C. Forty-two μl of a hexane solution containing 4.2 mg of tindioctoate was added. The reaction was allowed to proceed for 24 h upon which the reaction mixture was cooled to room temperature to obtain the product. Yield: 98% as a colourless oil.

The formation of poly(lactide-co-glycolide)2400triol was validated with the following analytical results: $^1$H-NMR (300 MHz, CDCl$_3$, 22° C., TMS): δ (ppm)=5.23-5.20 (m, 13.8H, CH (lac)); 4.82-4.70 (m, 28.4H, CH$_2$(gly)); 4.45-4.20 (m, 9.8H, —O(C═O)CH$_2$OH, —O(C═O)CH(CH$_3$)OH) and CH$_3$CH$_2$C(CH$_2$O—)$_3$); 2.65 (broad, 3H, —OH); 1.57 (m, 48.7H, CH$_3$(lac) and CH$_3$CH$_2$C(CH$_2$O—)$_3$); 0.87 (t, 3H, CH$_3$CH$_2$C(CH$_2$O—)$_3$); SEC: M$_w$=3500, PDI: 1.40.

Next, poly(lactide-co-glycolide)2400-triol (20.14 g, 8.40 mmol) was dissolved in THF (200 ml) by heating, triethylamine (9.0 ml, 64 mmol) was added and the reaction mixture was cooled to 0° C. upon which pentenoylchloride (6.67 ml, 60 mmol) was added and the temperature was maintained at 0° C. for 1 h. The mixture was left to stir at room temperature. Next, the reaction mixture was stirred for 20 min at 0° C. to precipitate the triethylamine hydrochloride salts formed during the reaction. The mixture was filtered and concentrated in vacuo. The residue was redissolved in chloroform and extracted with saturated aqueous NaCl solution, water. The organic layer was dried over Na$_2$SO$_4$ and the solvent was removed under vacuum. Yield 75% as a yellow oil.

The correct formation of poly(lactide-co-glycolide)2600-tri(4-pentenoate) was validated with the following analytical results: $^1$H-NMR (300 MHz, CDCl$_3$, 22° C., TMS): δ (ppm)= 5.79 (m, 3H, —CH═CH$_2$); 5.23-5.00 (m, 23.8H, —CH═CH$_2$ and CH (lac)); 4.85-4.69 (m, 31.3H, CH$_2$(gly)); 4.09 (m, 6H, CH$_3$CH$_2$C(CH$_2$O—)$_3$); 2.53-2.41 (m, 12H, —(C═O)CH$_2$CH$_2$— and —(C═O)CH$_2$CH$_2$—); 1.57 (m, 49.6H, CH$_3$(lac) and CH$_3$CH$_2$C(CH$_2$O—)$_3$); 0.88 (t, 3H, CH$_3$CH$_2$C(CH$_2$O—)$_3$); $^{13}$C-NMR (75 MHz, CDCl$_3$, 22° C.): δ (ppm)=172.2-166.4, 136.5, 135.6, 115.4, 69.4-68.1, 64.4, 60.9-60.2, 41.1, 33.1, 28.8, 25.6, 16.7, 7.2; IR (neat, cm$^{-1}$): 1749.2 (C═O, stretch), 1641.6 (C═C); SEC: M$_w$=4300, PDI: 1.25.

Example 5e

Components Comprising at Least One Ethylenically Unsaturated Group: Synthesis of PEG11500tetra(4-pentenoate) (PEG4P)

The synthesis of the water-soluble PEG11500tetra(4-pentenoate) (PEG4P) was done as described here. Under a nitrogen atmosphere, 4-arm hydroxyl terminated PEG (20 g, 2 mmol, MW 10.000, NEKTAR) was dissolved in 200 ml toluene and 50 ml dichloromethane, and cooled with an ice bath. To the clear solution triethylamine (2.8 ml, 20 mmol) was added. Then 4-pentenoylchloride (2.4 ml, 22 mmol) was added dropwise to this ice-cooled solution. The reaction was continued at room temperature overnight. Triethylamine salts were then (vacuum) filtered off, and the clear filtrate was precipitated into 2 l of ice-cold diethylether. The solid precipitate was collected and redissolved in chloroform (ca. 100 ml). This solution was reprecipitated into excess of hexane. The precipitate was collected and dried in vacuo. Yield: 72% as a white powder. The correct formation of PEG4P was validated with the following analytical results: $^1$H-NMR (300 MHz, CDCl$_3$, 22° C., TMS): δ 5.8 ppm (4H, —CH═CH$_2$), 5.0 (8H, CH$_2$═CH—), 4.2 (8H, —CH$_2$O(C═O)—), 3.6 (1000H, —OCH$_2$CH$_2$O—), 2.4 (16H, —CH$_2$CH$_2$CH═CH$_2$).

Example 6

Components Comprising at Least Two Thioic Acids

Example 6a

Synthesis of Dithio Adipic Acid (DTAA)

Dithio adipic acid (DTAA) was synthesized via the following procedure. A pyridine solution of adipic acid was added to a pyridine solution of carbonyl bisimidazole. After a few minutes a gas evolved (CO$_2$) and another few minutes later a precipitate was observed. After 30 min H$_2$S was bubbled through for 20 min upon which the reaction mixture was stirred for 1 h. A clear yellow solution was obtained, which was poured into a 1 M aqueous HCl solution. The aqueous layer was extracted with diethylether. The organic layer was dried and concentrated in vacuo and subsequently recrystallized to yield the product in 97% yield. The product was validated with the following analytical results: $^1$H-NMR (300 MHz, CDCl$_3$, 22° C., TMS): δ (ppm)=4.50 (s, 2H; HS(C═O)—), 2.63 (m, 4H; —(C═O)CH$_2$—); 1.70 (m, 4H; —(C═O)CH$_2$—CH$_2$—); $^{13}$C-NMR (100.6 MHz, CDCl$_3$, 22° C.): δ (ppm)=197.0, 45.1, 24.2; IR (neat crystals, cm$^{-1}$): 2535.9 (—S—H, stretch); 1667.9 (C═O, stretch); 1165 cm$^{-1}$ (C═S, weak), 722 (C(═O)—S, stretch). The position of the C═O stretch band was observed to depend on whether the spectra are recorded in the melted or crystalline state and whether oxo ester carbonyls were present or not.

Example 6b

Synthesis of PBADTA, a Polymer Comprising Two Thioic Acid Groups

Polymers comprising a thioic acid groups may also be prepared by reacting a polymer comprising at least two carboxylic acid groups with carbonyl bisimidazole in pyridine. Subsequently, H$_2$S may be bubbled through and the desired product may be obtained by acidifying the solution. Further purification may be necessary; therefore any suitable method known in the art may be applied.

A polymer comprising thioic acid groups may be prepared by dissolving a polymer comprising two carboxylic groups. For instance, a polyester prepared through a polycondensation reaction of butanediol with a 1.4 molar excess of adipic acid. This polymer may be dissolved in pyridine and added to a pyridine solution of carbonyl bisimidazole. After 30 min H$_2$S may be bubbled through for 20 min upon which the reaction mixture is stirred for 2 h. The solution obtained may be poured into a 1 M aqueous HCl solution and the aqueous layer extracted with diethylether. The organic layer may be dried and concentrated in vacuo. For further purification the polymer may be precipitated from a suitable non-solvent. In this way a polymer based on butanediol and adipic acid comprising on average 2 thioic acids is obtained. This polymer is termed PBADTA.

Example 6c

Synthesis of PLGDPTA, an Oligomer Comprising Thioic Acid Groups

An oligomer or polymer comprising at least two thioic acid groups may also be prepared by reacting a component comprising at least two ethylenically unsaturated groups with an excess of a component comprising at least two thioic acid groups. This excess is to be understood as a molar excess of more than 2, such as 4, 6 or 8 times excess of a component comprising at least two thioic acid groups, preferably an excess of 10, 20, 50 or more. It is also to be understood that preferably, at least one of the two components should be an oligomer or polymer. In that way particularly useful polymers comprising thioic acid residues may be obtained.

An oligomer comprising thioic acid groups may be synthesized by dissolving PLGDP in THF and adding an excess of DTAA, in a 10 to 1 molar ratio to PLGDP. Exposure to UV light will result in an oligomer comprising two thioester bonds and two thioic acid groups through the addition of on average two DTAA molecules to one PLGDP molecule. The oligomer may be purified using preparative SEC using THF as an eluent. The resulting oligomer is termed PLGDPTA.

Example 6d

Synthesis of Benzyl 6-chloro-6-oxohexanoate, a Building Block Used to Prepare Compounds Comprising Thioic Acid Groups Benzyl 6-chloro-6-oxohexanoate was synthesized as follows: A 2 l round bottom flask equipped with a Dean-Stark setup was charged with toluene (1000 ml), benzyl alcohol (160 g; 1.48 mol), adipic acid (180 g; 1.23 mol), and p-toluene sulfonic acid (2.34 g; 0.12 mol). The reaction mixture was refluxed overnight, resulting in the collection of 32 gram of water. Molsieves (4 Å) were added to the Dean-Stark, and refluxing was continued for an additional 1 hr. The reaction mixture was cooled to room temperature, and water (750 ml) was added. The pH of the aqueous phase was adjusted to pH=8 by addition of 6 M NaOH-solution (about 135 ml). The aqueous phase was isolated, and washed with $CH_2Cl_2$ (2 times 250 ml). The pH was adjusted to pH=2 by addition of 6 M HCl-solution (about 130 ml), which resulted in a turbid mixture. This was extracted with $CH_2Cl_2$ (2 times 400 ml), and the organic phase was dried over $Na_2SO_4$, filtered, concentrated, and dried in vacuo, to yield 6-(benzyloxy)-6-oxohexanoic acid as a colourless, waxy solid (126 g; 43% yield).

Next, oxalyl chloride (52.2 g; 0.41 mol) was dissolved in $CHCl_3$ (1000 ml), and cooled to 0° C. To this was slowly added a solution of 6(benzyloxy)-6-oxohexanoic acid, (81.0 g; 0.34 mol) in $CHCl_3$ (250 ml), and stirring was continued for 18 hr at room temperature. The reaction mixture was concentrated, coevaporated with $CHCl_3$ (2 times 250 ml), and dried in vacuo, to yield benzyl 6-chloro-6-oxohexanoate as a colourless liquid (87 g; 100%).

Example 6e

Synthesis of 6-{2,3-bis[(6-oxo-6-sulfanylhexanoyl)oxy]propoxy}-6-oxohexanethioic S-acid (GTTA), an Compound Comprising Thioic Acid Groups 6-{2,3-bis[(6-oxo-6-sulfanylhexanoyl)oxy]propoxy}-6-oxohexanethioic S-acid (GTTA, FIG. 5) was synthesized via the following procedure. Glycerol (7.65 g; 0.083 mol) was dissolved in $CHCl_3$ (400 ml) and pyridine (100 ml), and cooled to 0° C. Benzyl 6-chloro-6-oxohexanoate (69.8 g; 0.27 mol) was dissolved in $CHCl_3$ (200 ml), added drop wise at 0° C., and subsequently stirred at room temperature overnight. The reaction mixture was concentrated, and ether (1000 ml) was added. The turbid mixture was washed with 1 M HCl-solution (2 times 400 ml), and sat. $NaHCO_3$-solution (400 ml). The organic phase was dried over $Na_2SO_4$, filtered, concentrated, and dried in vacuo, to yield glycerol tri 1-benzyl 6-[2-{[6-(benzyloxy)-6-oxohexanoyl]oxy}-1-({[6-(benzyloxy)-6-oxohexanoyl]oxy}methyl)ethyl]hexanedioate (GTBE) as a colourless oil (65.3 g; 105%).

Next, A 1 l Parr-vessel was charged with GTBE (29.5 g; 0.039 mol), dioxane (90 ml), and water (10 ml). Argon was bubbled through the reaction mixture to remove traces of oxygen. 10% palladium on charcoal (0.76 g) was added, and the mixture was shaken under a hydrogen atmosphere of 70 psi for 50 hr. The pressure was carefully released, and argon was bubbled through the reaction mixture to remove traces of hydrogen. The reaction mixture was filtered over celite, concentrated, and dried in vacuo, to yield 6-{2,3-bis[(5-carboxypentanoyl)oxy]propoxy}-6-oxohexanoic acid GTOA as a colourless oil (16.5 g; 89%).

Carbonyldiimidazole (18.5 g; 0.114 mol) was dissolved in pyridine (120 ml), and glycerol derivative GTOA (16.5 g; 0.035 mol) dissolved in pyridine (80 ml) was added slowly. The reaction mixture was stirred at 20° C. for 30 min. Hydrogen sulfide was bubbled through the reaction mixture for 30 min, and subsequently, stirring was continued for an additional 1 hr. The reaction mixture was poured in a mixture of sulfuric acid (100 ml) and crushed ice (500 ml), and this was extracted with ether (2 times 300 ml). The organic layer was dried over $Na_2SO_4$, filtered, concentrated, and dried in vacuo, to yield the product as a colourless oil (16.4 g; 90%). The product was stored under an argon atmosphere at −20° C. The product was validated with the following analytical results: $^1$H-NMR (400 MHz, $CDCl_3$, 22° C., TMS): δ (ppm)=5.25 (m, 1H, $ROCH_2CHORCH_2OR$); 4.75 (broad, 3H, —SH); 4.21 (m, 4H, $ROCH_2CHORCH_2OR$); 2.64 (t, 6H, —$CH_2$(C=O)SH); 2.33 (t, 6H, —$CH_2$(C=O)O—); 1.66 (m, 12H, —$CH_2CH_2CH_2CH_2$—); IR (neat, $cm^-$): 2556.2 (—S—H, stretch); 1732.8 (C=O ester, stretch); 1698.0 (C=O thioic acid, stretch); 757.0 (C(=O)—S, stretch).

Example 6f

Synthesis of α,ω-bis[(6-oxo-6-sulfanylhexanoyl)oxy]poly(lactide-co-glycolide)1300 (PLGDTA), an Oligomer Comprising Thioic Acid Groups The degradable α,ω-bis[(6-oxo-6-sulfanylhexanoyl)oxy]poly(lactide-co-glycolide)1300 (PLGDTA, FIG. 6) was synthesized via poly(lactide-co-glycolide) 1100diol. Thereto, 49.54 g (340.34 mmol) of dl-lactide, 39.87 g (340.34 mmol) of glycolide and 10.62 g (100 mmol) of diethyleneglycol were melted at 150° C. 500 μl of a hexane solution containing 27.8 mg of tindioctoate was added. The reaction was allowed to proceed for 24 h upon which the reaction mixture was cooled to room temperature to obtain the product. Yield: 98% as a slight yellow oil. The formation of poly(lactide-co-glycolide)1100diol was validated with the following analytical results: $^1$H-NMR (300 MHz, $CDCl_3$, 22° C., TMS): δ (ppm)= 5.25-5.18 (m, 5.6H, CH (lac)); 4.83-4.74 (m, 11.5H, $CH_2$ (gly)); 4.30 (m, 6.7H, —(C=O)$OCH_2CH_2O$—, —O(C=O) $CH_2OH$, —O(C=O)CH($CH_3$)OH); 3.70 (m, 4H, —(C=O)

OCH$_2$CH$_2$O—); 2.79 (broad, 2H, —OH); 1.58 (m, 19.9H, CH$_3$(lac)); SEC (R1 detector): M$_w$=1500, PDI: 2.10.

Next, poly(lactide-co-glycolide)1100diol (48.0 g; 48.0 mmol) was dissolved in CHCl$_3$ (250 ml) and pyridine (50 ml), and cooled to 0° C. Benzyl 6-chloro-6-oxohexanoate (69.8 g; 0.27 mol) was dissolved in CHCl$_3$ (200 ml), added dropwise at 0° C., and subsequently stirred at room temperature for 3 hr. The reaction mixture was concentrated, and CH$_2$Cl$_2$ (1000 ml) was added. This mixture was washed with 1 M HCl-solution (2 times 500 ml), and sat. NaHCO$_3$-solution (2 times 500 ml). The organic phase was dried over Na$_2$SO$_4$, filtered, concentrated, and dried in vacuo, to yield a polymer termed PLGDBE as a slightly brown oil (66.0 g; 96%).

A 1 l Parr-vessel was charged with PLGDBE (66.0 g), dioxane (90 ml), and water (10 ml). Argon was bubbled through the reaction mixture to remove traces of oxygen. 10% palladium on charcoal (0.89 g) was added, and the mixture was shaken under a hydrogen atmosphere of 70 psi for 24 hr. The pressure was carefully released, and argon was bubbled through the reaction mixture to remove traces of hydrogen. The reaction mixture was filtered over celite, concentrated, coevaporated with pyridine (50 ml), and dried in vacuo, to yield a polymer termed PLGDOA as a slightly brown oil (61 g).

Carbonyldiimidazole (22.85 g; 0.141 mol) was dissolved in pyridine (200 ml), and PLGDOA (59.0 g; 0.047 mol) dissolved in pyridine (300 ml) was added slowly. The reaction mixture was stirred at 20° C. for 1 hr. Hydrogen sulfide was bubbled through the reaction mixture for 45 min, and subsequently, stirring was continued for an additional 1 hr. The reaction mixture was poured in a mixture of sulfuric acid (250 ml) and crushed ice (1400 ml), and this was extracted with CH$_2$Cl$_2$ (2 times 800 ml). The organic layer was washed with 1 M H$_2$SO$_4$ (2 times 700 ml), dried over Na$_2$SO$_4$, filtered, concentrated, and dried in vacuo, to yield the product as a brown oil (50.0 g; 83%). The product was validated with the following analytical results: $^1$H-NMR (400 MHz, CDCl$_3$, 22° C., TMS): δ (ppm)=5.31-5.18 (m, 6.5H, CH (lac)); 4.87-4.75 (m, 14.1H, CH$_2$(gly)); 4.32 (m, 4H, —(C═O)OCH$_2$CH$_2$O—); 3.69 (m, 4H, —(C═O)OCH$_2$CH$_2$O—); 2.66 (m, 4H, —CH$_2$(C═O)SH); 2.46 (m, 4H, —CH$_2$CH$_2$(C═O)O—); 1.71 (m, 8H, —CH$_2$CH$_2$CH$_2$CH$_2$—); 1.57 (m, 21.5H, CH$_3$(lac)); IR (neat, cm$^{-1}$): 2561.7 (—S—H, stretch); 1744.6 (C═O ester, stretch); ~1700 (shoulder to band at 1744.6, C═O thioic acid, stretch); 735.6 (C(═O)—S, stretch).

Example 6g

Synthesis of tris[(6-oxo-6-sulfanylhexanoyl)oxy] poly(lactide-co-glycolide)2000 (PLGTTA), an Oligomer Comprising Thioic Acid Groups The degradable oligomer tris[(6-oxo-6-sulfanylhexanoyl)oxy]poly(lactide-co-glycolide)2000 (PLGTTA, FIG. 7) was synthesized via poly(lactide-co-glycolide)1600-triol. Thereto, 110.96 g (769.9 mmol) of dl-lactide, 89.36 g (769.9 mmol) of glycolide and 19.68 g (146.7 mmol) of trimethylolpropane were melted at 150° C. One hundred μl of a hexane solution containing 62.3 mg of tindioctoate was added. The reaction was allowed to proceed for 24 h upon which the reaction mixture was cooled to room temperature to obtain the product. Yield: 98% as a colourless oil.

The formation of poly(lactide-co-glycolide)1600-triol was validated with the following analytical results: $^1$H-NMR (300 MHz, CDCl$_3$, 22° C., TMS): δ (ppm)=5.23-5.20 (m, 9.9H, CH (lac)); 4.82-4.70 (m, 18.8H, CH$_2$(gly)); 4.45-4.11 (m, 10.6H, —O(C═O)CH$_2$OH, —O(C═O)CH(CH$_3$)OH) and CH$_3$CH$_2$C(CH$_2$O—)$_3$); 2.65 (broad, 3H, —OH); 1.57 (m, 33.6H, CH$_3$(lac) and CH$_3$CH$_2$C(CH$_2$O—)$_3$); 0.87 (t, 3H, CH$_3$CH$_2$C(CH$_2$O—)$_3$); SEC: M$_w$=2300, PDI: 1.32.

Poly(lactide-co-glycolide)1600-triol (44.3 g; 30.0 mmol) was dissolved in CHCl$_3$ (250 ml) and pyridine (50 ml), and cooled to 0° C. Benzyl 6-chloro-6-oxohexanoate (24.8 g; 0.097 mol) was dissolved in CHCl$_3$ (250 ml), added drop wise at 0° C., and subsequently stirred at room temperature for 3 hr. The reaction mixture was concentrated, and CH$_2$Cl$_2$ (1000 ml) was added. This mixture was washed with 1 M HCl-solution (2 times 500 ml), and sat. NaHCO$_3$-solution (2 times 500 ml). The organic phase was dried over Na$_2$SO$_4$, filtered, concentrated, and dried in vacuo, to yield a polymer termed PLGTBE as a slightly brown oil (66.0 g; 104%).

A 1 l Parr-vessel was charged with PLGTBE (66.0 g), dioxane (90 ml), and water (10 ml). Argon was bubbled through the reaction mixture to remove traces of oxygen. 10% palladium on charcoal (0.83 g) was added, and the mixture was shaken under a hydrogen atmosphere of 70 psi for 48 hr. The pressure was carefully released, and argon was bubbled through the reaction mixture to remove traces of hydrogen. The reaction mixture was filtered over celite, concentrated, coevaporated with pyridine (50 ml), and dried in vacuo, to yield a polymer termed PLGTOA as a slightly brown oil (62.5 g).

Carbonyldiimidazole (21.8 g; 0.135 mol) was dissolved in pyridine (200 ml), and PLGTOA (59.0 g; 0.031 mol) dissolved in pyridine (300 ml) was added slowly. The reaction mixture was stirred at 20° C. for 1 hr. Hydrogen sulfide was bubbled through the reaction mixture for 45 min, and subsequently, stirring was continued for an additional 1 hr. The reaction mixture was poured in a mixture of sulfuric acid (250 ml) and crushed ice (1250 ml), and this was extracted with CH$_2$Cl$_2$ (2 times 600 ml). The organic layer was washed with 1 M H$_2$SO$_4$ (2 times 500 ml), dried over Na$_2$SO$_4$, filtered, concentrated, and dried in vacuo, to yield the product as a brown oil (52.5 g; 87%). The product was validated with the following analytical results: $^1$H-NMR (400 MHz, CDCl$_3$, 22° C., TMS): δ (ppm)=5.29-5.21 (m, 9.7H, CH (lac)); 4.81-4.69 (m, 20.8H, CH$_2$(gly)); 4.09 (m, 6H, CH$_3$CH$_2$C(CH$_2$O—)$_3$); 2.64 (m, 6H, —CH$_2$(C═O)SH); 2.43 (m, 6H, —CH$_2$CH$_2$(C═O)O—); 1.69 (m, 12H, —CH$_2$CH$_2$CH$_2$CH$_2$—); 1.57 (m, 33.3H, CH$_3$(lac)); IR (neat, cm$^{-1}$): 2566.4 (—S—H, stretch); 1746.8 (C═O ester, stretch); 1704.3 (C═O thioic acid, stretch); 734.9 (C(═O)—S, stretch).

Example 7

Compositions Used for the Preparation of Linear Polymers Comprising at Least Two Thioester Bonds Compositions A and B were prepared with equimolar ratios of triethyleneglycol divinyl ether (TEGDVE) and dithio adipic acid (DTAA) containing 2 wt % of Irgacure 184. Composition A additionally contained 0.2 wt % of propyl gallate as a radical stabilizer. Compositions C and D contained a slight molar excess of DTAA (table 1). Composition D did not comprise a photoinitiator (table 1).

TABLE 1

Compositions for the preparation of linear polymers comprising at least two thioester bonds.

| Materials | A (% w/w) | B (% w/w) | C (% w/w) | D (% w/w) |
|---|---|---|---|---|
| TEGDVE | 51.9 | 52.0 | 48.4 | 49.4 |
| DTAA | 45.9 | 46.0 | 49.6 | 50.6 |
| Irgacure 184 | 2.0 | 2.0 | 2.0 | |
| Propyl gallate | 0.2 | | | |
| Total | 100 | 100 | 100 | 100 |
| Molar ratio* | 1:1 | 1:1 | 1:1.16 | 1:1.16 |

*Molar ratio: molar ratio of ethylenically unsaturated group:thioic acid group

Molar ratios of ethylenically unsaturated groups to thioic acid groups as mentioned herein were calculated using the molecular weights and functionalities as shown in table 2. Molecular weights of PLGDTA, PLGTTA, PEG4P, PLGDP, PCLDP and PLGTP were calculated based on $^1$H-NMR.

TABLE 2

Molecular weight of components used in a method according to the present invention.

| Component | Functionality* | Molecular Weight |
|---|---|---|
| DTAA | 2 | 178.28 |
| GTTA | 3 | 524.67 |
| PLGDTA | 2 | 1331 |
| PLGTTA | 3 | 2027 |
| TEGDVE | 2 | 202.25 |
| PLGDP | 2 | 1233 |
| PCLDP | 2 | 2055 |
| PLGTP | 3 | 2832 |
| PEG4P | 4 | 11500 |

*Number of ethylenically unsaturated groups or thioic acid groups contained within a component Yet another set of compositions (E and F) was prepared with poly(lactide-co-glycolide)1200di(4-pentenoate) (PLGDP) as the component comprising the ethylenically unsaturated groups instead of TEGDVE. Composition E was prepared with photoinitiator and composition F without photoinitiator (table 3).

TABLE 3

Compositions for the preparation of linear polymers comprising at least two thioester bonds

| Materials | E (% w/w) | F (% w/w) |
|---|---|---|
| PLGDP | 72.2 | 73.4 |
| DTAA | 12.1 | 12.3 |
| Irgacure 184 | 1.7 | |
| THF | 14.0 | 14.7 |
| Total | 100 | 100 |
| Molar ratio* | 1:1.16 | 1:1.16 |

*Molar ratio: molar ratio of ethylenically unsaturated group:thioic acid group

Yet another composition (composition G) was prepared comprising PLGDP, PCLDP and DTAA, in a molar ratio of 1:0.97:2.5 (Table 4). In addition composition J was prepared comprising the oligomeric components PLGDP and PLGDTA.

TABLE 4

Compositions used for the preparation of linear polymers comprising at least two thioester bonds.

| Materials | G (% w/w) | J (% w/w) |
|---|---|---|
| PLGDP | 18.8 | 41.6 |
| PCLDP | 32.8 | |
| DTAA | 6.9 | |
| PLGDTA | | 43.1 |
| Darocure 1173 | | 0.9 |
| Irgacure 2959 | 1.1 | |
| DCM | | 1.8 |
| THF | 40.4 | 12.6 |
| Total | 100 | 100 |
| Molar ratio | 1:0.97:2.5* | 1:0.95** |

*Molar ratio of PLGDP to PCLDP to DTAA.
**Molar ratio of PLGDP to PLGDTA

Example 8

Compositions Used for the Preparation of Crosslinked Polymers Comprising Thioester Bonds Compositions H and I were prepared with PLGTP and DTAA containing 1.7 wt % of photoinitiator. Composition H comprised hydrophobic Irgacure 184 as the photo initiator and composition I comprised water-soluble Irgacure 2959 as the photoinitiator. Compositions K and L were prepared with PLGDP and with GTTA and PLGTTA respectively. Both compositions were prepared with Darocure 1173 as the photoinitiator. In addition composition M was prepared. The molar ratio of thioic acid groups to ethylenically unsaturated groups was varied between formulations. Composition H comprised PLGTP and DTAA in a molar ratio of 1:1.94 whereas composition I comprised PLGTP and DTAA in a molar ratio of 1:1 (table 5). In addition compositions K to M were prepared comprising various components X and Y.

TABLE 5

Compositions used for the preparation of crosslinked polymers comprising at least two thioester bonds.

| Materials | H (% w/w) | I (% w/w) | K (% w/w) | L (% w/w) | M (% w/w) |
|---|---|---|---|---|---|
| PLGTP | 70.8 | 77.8 | | | |
| PLGDP | | | 65.8 | 40.1 | |
| PEG4P | | | | | 26.2 |
| DTAA | 12.9 | 7.3 | | | 0.9 |
| GTTA | | | 22.5 | | |
| PLGTTA | | | | 39.7 | |
| Irgacure 2959 | | 1.7 | | | 0.2 |
| Irgacure 184 | 1.7 | | | | |
| Darocure 1173 | | | 1.0 | 0.9 | |
| DCM | | | | 3.5 | |
| THF | 14.6 | 13.2 | 10.7 | 15.8 | 72.7 |
| Total | 100 | 100 | 100 | 100 | 100 |
| Molar ratio | 1:1.94 | 1:1 | 1:1.21 | 1:0.90 | 0.91:1 |

* Molar ratio: molar ratio of ethylenically unsaturated group:thioic acid group

Example 9

Synthesis of Linear Polymers Comprising at Least Two Thioester Bonds

Example 9a

Linear Polymers Based on DTAA and TEGDVE can be Obtained by UV Polymerization Compositions A and B were exposed to UV light as described in example 2. The reaction between DTAA and TEGDVE (FIG. 1) was monitored by FT-IR. It was observed that more than 90% of the ethylenically unsaturated groups were consumed and that the thioic S—H bonds were consumed in an about equimolar fashion. Based on the data obtained, it may be concluded that the ethylenically unsaturated groups were converted at a rate of approximately 40%/s in the absence of a radical stabilizer (composition B) and approximately 25%/s in the presence of radical stabilizer (composition A). This shows that the reaction rate can be controlled by the addition of a radical stabilizer.

When the spectra before and after illumination were compared it was clear that the ethylenically unsaturated groups had disappeared. Clearly, also the —S—H at 2558 cm$^{-1}$ had disappeared as well as the band related to —(C=S) at 1165 cm$^{-1}$. Furthermore shifts of the —(C=O)— band and of the —C—S— stretch band at 722 cm$^{-1}$ to 680 cm$^{-1}$ indicate thioester bond formation. Furthermore, an increase in viscosity was observed indicating polymerization.

FT-IR analysis of DTAA demonstrated that the thioic acid functionality occurs as the —(C=O)SH isomer as well as the —(C=S)OH isomer. FT-IR analysis of the polymers formed upon reaction of DTAA and TEGDVE showed that the thioic acid reacted via the —(C=O)SH form as no —(C=S)— related bands could be observed anymore.

Example 9b

Linear Polymers Based on DTAA and TEGDVE Containing Thioester Bonds Obtained Through Markownikoff as Well as Anti-Markownikoff Additions Composition C was applied to a glass plate and passed under the UV lamp as described in example 2. A high viscosity liquid was obtained. $^1$H-NMR showed the consumption of all ethylenically unsaturated groups. The following analytical results were obtained: $^1$H-NMR (300 MHz, CDCl$_3$, 22° C., TMS): δ (ppm)=5.47 (q, 0.5H, —SCH(CH$_3$)—); 3.66-3.57 (m, 13.7H, —OCH$_2$CH$_2$O— and —SCH$_2$CH$_2$O—); 3.09 (t, 2.5H, —SCH$_2$CH$_2$O—); 2.57 (m, 4H, —(C=O)CH$_2$CH$_2$CH$_2$CH$_2$(C=O)—); 1.69-1.60 (m, 6.5H, —(C=O)CH$_2$CH$_2$CH$_2$CH$_2$(C=O)— and —SCH(CH$_3$)—); $^{13}$C-NMR (75 MHz, CDCl$_3$, 22° C.): δ (ppm)=199.0, 198.5, 81.3, 71.3-69.8, 68.4, 43.5, 43.4, 28.5, 24.5, 23.0; IR (neat, cm$^{-1}$): 1681.4 (C=O, stretch).

Two types of addition products with either a Markownikoff and/or with an anti-Markownikoff type of reaction product were obtained (FIG. 2). By comparing the integrals of the resonances at δ=5.47 and at δ=3.09 ppm, it was established that the Markownikoff to anti-Markownikoff addition occurred in a 2:5 ratio.

SEC analysis indicated the formation of a polymer with a weight average molecular weight (M$_w$) of 8900 relative to polystyrene standards. Similar results were obtained when composition C received only 2 J/cm$^2$ (2:5 ratio, M$_w$ of 8700).

Example 9c

Linear Polymers Based on DTAA and TEGDVE can be Obtained by Polymerization in the Dark Compositions A and B were kept for 6 days in the dark at room temperature. The viscosity of the starting composition increased and a high viscosity liquid was obtained. $^1$H-NMR showed the almost complete consumption of the ethylenically unsaturated groups and the formation of thioester bonds. As in the case of light induced polymerization, two types of addition products were formed, however in this case the Markownikoff addition to the anti-Markownikoff product occurred in a 3 to 1 ratio.

The preference for the anti-Markownikoff addition via a radical mechanism under the influence of UV-light and the preference for the Markownikoff addition via an electrophilic addition mechanism in the dark are in line with theory. Thereby this provides a mechanism to further tune the properties of the polymers comprising thioester bonds.

SEC analysis of the resulting high viscosity liquid indicated the formation of a polymeric material. The sample without propyl gallate (composition B) had an M$_w$ of 37000 compared to polystyrene standards, whereas the sample with propyl gallate (Composition A) had an M$_w$ of 49000. The addition of a radical stabilizer does not significantly affect the polymerization in the dark. This is in line with theory, since this reaction is occurring via an electrophilic addition mechanism.

This example shows that the method according to the invention may be performed in the dark, i.e in the absence of light such as UV light. This may in particular be an advantage when the use of light in particular UV light is not preferred for a specific application.

Example 9d

The Molecular Weight of Polymers Comprising at Least Two Thioester Bonds May be Influenced by the Molar Ratio of Thioic Acid Groups and Ethylenically Unsaturated Groups Composition D was kept in the dark for 6 days at 35° C. under nitrogen atmosphere. The resulting polymer displayed a 10:9 ratio of the Markownikoff to the anti-Markownikoff addition product with an M$_w$ of 8800.

In comparison to compositions A and B, compositions C and D contained a slight excess of thioic acid groups to ethylenically unsaturated groups. This difference in molar ratio of DTAA and TEGDVE appeared to have a great impact on the molecular weights obtained in the polymerization reactions (table 6).

TABLE 6

SEC data of linear polymers comprising thioester bonds obtained after polymerization of the compositions A, B, C and D.

| Composition | M$_n$ (×10$^3$ Da) | M$_w$ (×10$^3$ Da) | M$_z$ (×10$^3$ Da) | PDI | Polymerisation |
|---|---|---|---|---|---|
| A | 24 | 49 | 81 | 2.04 | Dark, RT |
| B | 8.5 | 37 | 78 | 4.33 | Dark, RT |
| C | 3.8 | 8.9 | 15 | 2.31 | UV, RT |
| D | 3.5 | 8.8 | 15 | 2.52 | Dark, 35° C. |

Example 9e

Linear Polymers Based on DTAA and PLGDP

Composition E was applied to a glass plate and passed under the UV lamp as described in example 2. Composition E differs from compositions A to D described above, in that composition E comprises a polymer with electron poor ethylenically unsaturated groups (FIG. 3) as opposed to the electron rich ethylenically unsaturated groups of TEGDVE.

The following analytical results were obtained for composition E after polymerization. $^1$H-NMR (300 MHz, CDCl$_3$, 22° C., TMS): δ (ppm)=5.23-5.00 (m, 6.6H, CH (lac)); 4.86-4.73 (m, 14.1H, CH$_2$(gly)); 4.31 (m, 4H, —(C═O)OCH$_2$CH$_2$O—); 3.69 (m, 4H, —(C═O)OCH$_2$CH$_2$O—); 2.88 (t, 4H, —(C═O)SCH$_2$CH$_2$CH$_2$CH$_2$—); 2.56 (m, 4H, —(C═O)CH$_2$CH$_2$CH$_2$CH$_2$(C═O)—); 2.43 (m, 4H, —(C═O)SCH$_2$CH$_2$CH$_2$CH$_2$—); 1.69-1.52 (m, 42.1H, CH$_3$ (lac), —(C═O)CH$_2$CH$_2$CH$_2$CH$_2$(C═O)— and —(C═O)SCH$_2$CH$_2$CH$_2$CH$_2$—); $^{13}$C-NMR (75 MHz, CDCl$_3$, 22° C.): δ (ppm)=192.3, 172.6-166.4, 136.5, 115.6, 69.4-68.2, 61.0-60.2, 43.5, 33.4, 33.1, 28.9, 28.3, 24.8, 23.8, 16.7; IR (neat, cm$^{-1}$): 1747.1 ((C═O)O, stretch), 1684.9 ((C═O)S, stretch); SEC: $M_w$=18000, PDI: 3.85.

The above NMR analysis showed the consumption of all ethylenically unsaturated groups, and the formation of thioester bonds. It also showed that the additions of thioic acids to ethylenically unsaturated groups occurred in the anti-Markownikoff fashion. This observation shows that polymers comprising thioester bonds obtained through anti-Markownikoff addition can be produced by using electron-poor ethylenically unsaturated groups in a method of the present invention. The ratio of Markownikoff to anti-Markownikoff addition may influence the polymer properties, e.g. its (bio) degradation.

The formation of polymers was confirmed by SEC (table 7).

Composition F was kept in the dark at 35° C. under nitrogen atmosphere. No reaction was observed after 37 days. This shows that photochemical polymerization, in particular UV or visible light polymerization is preferred when electron-poor ethylenically unsaturated groups are to be used in a method of the present invention. This shows that a composition can be prepared which can be stored after admixing the respective components and applied to the site of application without significant thioester bond formation. At any point the formation of a polymer comprising thioester bonds may then be triggered by exposing the composition to light.

TABLE 7

SEC data of linear polymers comprising at least two thioester bonds obtained after polymerization of the compositions E and F.

| Composition | $M_n$ (×10$^3$ Da) | $M_w$ (×10$^3$ Da) | $M_z$ (×10$^3$ Da) | PDI | Polymerisation |
|---|---|---|---|---|---|
| E | 4.8 | 18 | 53 | 3.85 | UV, RT |
| F | Did not form polymers comprising thioester bonds | | | | Dark, 35° C. |

Example 9f

Linear Polymers Based on DTAA, PLGDP and PCLDP

To prepare yet another polymer comprising thioester bonds, composition G was applied to a glass plate and passed under the UV-lamp as described in example 2. A sample was obtained, which was dried overnight in vacuo at room temperature. The sample was dissolved in THF for analysis by SEC and dissolved in deuterated chloroform for $^1$H-NMR. The following analytical results were obtained indicating the formation of a polymer comprising thioester bonds:

$^1$H-NMR (300 MHz, CDCl$_3$, 22° C., TMS): δ (ppm)=5.28-5.04 (m, 6.4H, CH (lac)); 4.86-4.73 (m, 13.5H, CH$_2$(gly)); 4.31 (m, 4H, —(C═O)OCH$_2$CH$_2$O— of poly(lactide-co-glycolide) part); 4.23 (m, 4H, —(C═O)OCH$_2$CH$_2$O— of PCL part); 4.05 (m, 31.5H, —OCH$_2$CH$_2$CH$_2$CH$_2$CH$_2$(C═O)—); 3.70 (m, 8H, —(C═O)OCH$_2$CH$_2$O— of poly (lactide-co-glycolide) part & of PCL part); 2.88 (t, 8H, —(C═O)SCH$_2$CH$_2$CH$_2$CH$_2$—); 2.56 (m, 8H, —(C═O)CH$_2$CH$_2$CH$_2$CH$_2$(C═O)—); 2.49-2.27 (m, 39.7H, —(C═O)SCH$_2$CH$_2$CH$_2$CH$_2$—) and —OCH$_2$CH$_2$CH$_2$CH$_2$CH$_2$(C═O)—)); 1.76-1.48 (m, 109.9H, —OCH$_2$CH$_2$CH$_2$CH$_2$CH$_2$(C═O)—, CH$_3$(lac), —(C═O)CH$_2$CH$_2$CH$_2$CH$_2$(C═O)— and —(C═O)SCH$_2$CH$_2$CH$_2$CH$_2$—); 1.40 (m, 31.2H, —OCH$_2$CH$_2$CH$_2$CH$_2$CH$_2$(C═O)—).

SEC demonstrated the formation of polymers (Table 8). NMR showed the complete consumption of all ethylenically unsaturated groups as well as the formation of thioester bonds through addition in an anti-Markownikoff fashion. Both techniques demonstrate the formation of a polymer containing poly(lactide-co-glycolide) segments as well as poly(ε-caprolactone) segments.

TABLE 8

SEC data of linear polymers comprising thioester bonds obtained after UV-light induced polymerization of composition G.

| Composition | $M_n$ (×10$^3$ Da) | $M_w$ (×10$^3$ Da) | $M_z$ (×10$^3$ Da) | PDI | Polymerisation |
|---|---|---|---|---|---|
| G | 9.9 | 41 | 131 | 4.12 | UV, RT |

Example 9g

Linear Polymers Based on PLGDTA and PLGDP

To prepare yet another polymer comprising at least two thioester bonds Composition J was applied to a glass plate and passed under the UV lamp as described in example 2. The following analytical results were obtained for composition J after polymerization. $^1$H-NMR (300 MHz, CDCl3, 22° C., TMS): δ (ppm)=5.23-5.00 (m, 12.6H, CH (lac)); 4.86-4.73 (m, 27.1H, CH$_2$(gly)); 4.24 (m, 8H, —(C═O)OCH$_2$CH$_2$O—); 3.62 (m, 8H, —(C═O)OCH$_2$CH$_2$O—); 2.88 (t, 4H, —(C═O)SCH$_2$CH$_2$CH$_2$CH$_2$—); 2.50 (m, 4H, —(C═O)SCH$_2$CH$_2$CH$_2$CH$_2$—); 2.36 (m, 8H, —(C═O)CH$_2$CH$_2$CH$_2$CH$_2$(C═O)—; 1.64-1.45 (m, 57.8H, CH$_3$(lac), —(C═O)CH$_2$CH$_2$CH$_2$CH$_2$(C═O)— and —(C═O)SCH$_2$CH$_2$CH$_2$CH$_2$—); IR (neat, cm$^{-1}$): 1744.2 ((C═O)O, stretch), 1686.6 ((C═O)S, stretch); SEC: $M_w$=34000, PDI: 4.24.

The above NMR analysis showed the consumption of all ethylenically unsaturated groups, and the formation of thioester bonds.

The formation of polymers was confirmed by SEC (table 81).

TABLE 9

SEC data of linear polymers comprising at least two thioester bonds obtained after polymerization of the composition J.

| Composition | $M_n$ (×10³ Da) | $M_w$ (×10³ Da) | $M_z$ (×10³ Da) | PDI | Polymerisation |
|---|---|---|---|---|---|
| J | 7.9 | 34 | 100 | 4.24 | UV, RT |

Example 10a

Synthesis of Crosslinked Polymers Comprising Thioester Bonds

Compositions H and I were applied to a glass plate and passed under the UV-lamp as described in example 2.

A rubber-like material was obtained, which could not be dissolved in THF or chloroform indicating that a crosslinked network can be prepared using a method according to this invention. In addition, this shows that several photoinitiators may be used to obtain crosslinked networks. It also shows that a wide range of molar ratios of the ethylenically unsaturated groups to thioic acid groups may be used to generate crosslinked polymers.

Crosslinked polymers obtained from composition H differed in mechanical properties from the polymers obtained from composition 1. These differences may include mechanical properties such as, elongation at break, yield point and moduli. Further, polymers obtained from composition H may further differ with respect to network density, swelling behavior as well as degradation behavior and drug release profile.

Example 10b

Synthesis of Crosslinked Polymers Comprising Thioester Bonds from a Compound Comprising More than Two Thioic Acid Groups (GTTA) and an Oligomer Comprising Ethylenically Unsaturated Groups (PLGDP)

Compositions K was applied to a glass plate and passed under the UV-lamp as described in example 2. A rubber-like material was obtained, which could not be dissolved in THF or chloroform indicating that a crosslinked network can be prepared using a method according to this invention.

FTIR showed that upon UV exposure the —S—H bonds and ethylenically unsaturated bonds disappeared. In addition, a shift of the C═O at 1698 cm⁻¹ to 1685 cm⁻¹ indicated the formation of thioester bonds. This shows that crosslinked networks can also be prepared from a compound comprising more than two thioic acid groups and a compound comprising ethylenically unsaturated groups.

The following analytical results were obtained for composition K after polymerization. IR (neat, cm⁻¹): 1740.2 ((C═O)O, stretch), 1685.1 ((C═O)S, stretch).

Example 10c

Synthesis of Crosslinked Polymers Comprising Thioester Bonds from an Oligomer Comprising at Least Two Thioic Acid Groups (PLGTTA) and an Oligomer Comprising Ethylenically Unsaturated Groups (PLGDP)

Compositions L was applied to a glass plate and passed under the UV-lamp as described in example 2. A rubber-like material was obtained, which could not be dissolved in THF or chloroform indicating that a crosslinked network can be prepared using a method according to this invention.

FTIR showed that upon UV exposure the —S—H bonds and ethylenically unsaturated bonds disappeared. In addition, a shift of the C═O at 1700 cm⁻¹ to 1687 cm⁻¹ indicated the formation of thioester bonds. This example shows that a crosslinked network can be prepared from an oligomer comprising more than two thioic acid groups and an oligomer comprising ethylenically unsaturated groups. In addition, this shows that several photoinitiators may be used to obtain crosslinked networks. Furthermore examples 10 a-c show that crosslinked networks can be prepared from compounds containing ethylenically unsaturated groups and a wide range of compounds containing thioic acid groups. The obtained crosslinked networks may differ with respect to mechanical properties, network density, swelling behavior, as well as drug release profile and degradation behavior. The following analytical results were obtained for composition L after polymerization. IR (neat, cm⁻¹): 1744.2 ((C═O)O, stretch), 1686.6 ((C═O)S, stretch).

Example 10d

Synthesis of Crosslinked Polymers Comprising Thioester Bonds from DTAA and an Oligomer Comprising Ethylenically Unsaturated Groups (PEG4P) Forming a Hydrogel Composition M did not spontaneously show gelation at room temperature. After evaporating ca. half of the solvent, the solution was transferred into small circular Teflon moulds. The resulting solution was exposed to UV light (1 J/cm²) resulting in the formation of firm gels, which could be easily removed from the moulds.

The thioester-crosslinked PEG displayed swelling when placed in a PBS buffer and did not dissolve showing that a crosslinked network had formed. This example shows that crosslinked hydrogel networks can be obtained by a method according to the invention.

Example 11

Hydrolytic Degradation of Linear Polymers Comprising at Least Two Thioester Bonds that are Based on DTAA and TEGDVE To study the hydrolytic stability of the thioester bond, composition A was allowed to polymerize at room temperature for 6 days in the dark. The water-insoluble polymer obtained, was applied to a glass cover slip and submerged in a phosphate buffered saline solution (PBS) at a pH of 7.4 at 37° C. The buffer was refreshed every 7 days.

Except for the thioester bonds, this polymer only contains non-hydrolyzable linkages and therefore a decrease in the weight averaged molecular weight observed under (hydrolytic) degradation conditions is necessarily the result of hydrolysis of the thioester bonds (FIG. 8).

After 43 days a sample of the PBS solution was analyzed by LC-MS. The theoretical degradation product adipic acid (FIG. 8) was indeed observed.

After 77 days the sample was taken out of the PBS solution, washed with water and dried. ¹H-NMR showed clearly that no changes had occurred in the chemical composition of the initial polythioester, as expected. During hydrolytic degradation the polymer composition is in fact expected to remain the same while the average molecular weight is decreasing. SEC clearly showed that the average molecular weight of the polymers decreased in time (Table 10) indicating that the thioester bonds were hydrolyzed in a buffer with a physiological salt concentration at 37° C.

TABLE 10

SEC data of a linear polymer obtained after polymerization of composition A in the dark before and after 77 days of hydrolytic degradation.

| Time (days) | $M_n$ (×10³ Da) | $M_w$ (×10³ Da) | $M_z$ (×10³ Da) | PDI |
|---|---|---|---|---|
| 0 | 24 | 49 | 81 | 2.04 |
| 77 | 4.6 | 8.5 | 14 | 1.84 |

Example 12

Degradation of Linear Polymers Comprising at Least Two Thioester Bonds, Based on DTAA and PLGDP Example 12a Hydrolytic Degradation Composition E was applied to a glass plate and passed under the UV lamp as described in example 2. The resulting polymers were dissolved in THF and cast onto glass cover slips. The solvent was allowed to evaporate and the samples were subsequently dried overnight at room temperature in vacuo. The samples were placed in 10 ml of PBS. The solutions were refreshed every 2-3 days and the pH of the replaced buffer solution was measured (FIG. 9). The weight loss of the samples and the average molecular weight of the polymers were monitored as a measure for degradation (FIG. 10 and Table 11).

TABLE 11

SEC data of linear polymers obtained after UV light induced polymerization of composition E during its hydrolytic degradation.

| t (days) | $M_n$ (×10³ Da) | $M_w$ (×10³ Da) | $M_z$ (×10³ Da) | PDI |
|---|---|---|---|---|
| 0 | 4.8 | 18 | 53 | 3.85 |
| 4 | 6.6 | 26 | 90 | 3.98 |
| 6 | 7.3 | 22 | 61 | 2.99 |
| 11 | 4.7 | 13 | 34 | 2.84 |

When the buffer solution was refreshed every 2-3 days, the pH of the replaced buffer solution was measured and a significant decrease in pH (delta pH) could be observed between the starting pH (7.4) and the pH after 2-3 days. During the course of the experiment, the delta pH even increased (FIG. 9). From these data the conclusion may be drawn that hydrolysis occurred at an increasing rate. This increase in delta pH occurred at least until day 15 in this particular experiment.

The sample was observed to loose weight (FIG. 10). The first 10% of weight were already lost after 4 days (the first data point) and were probably not related to degradation of the polymers, but most likely consisted of low molecular weight water-soluble material. After 20 days the polymer sample had lost 70% of its weight.

To monitor the average molecular weight of the polymers on the substrate, 10 samples were submerged in buffer solution and for each data point two samples were taken, washed three times for three hours with distilled water, dried and dissolved in THF for SEC analysis or in deuterated chloroform for NMR analysis. The average molecular weight of the polymers remaining on the substrate was monitored by SEC until the sample had degraded to an extent that no longer enough material could be recovered from the cover slips for analysis. The SEC data showed that the average molecular weight had decreased after 6 days. After 11 days the average molecular weight had decreased even further. Taken together, these data prove that the polymer degraded under hydrolyzing conditions.

¹H-NMR demonstrated that after 11 days the composition of the polymer had not changed significantly: only a slight decrease of the proton resonances related to the lactic and glycolic ester building blocks compared to the other resonances was observed. After 11 days additional resonances were observed at 5.5 ppm, 3.9 ppm and 1.4 ppm, which are probably resulting from degradation products.

Example 12b

Enzymatic Degradation

For enzymatic degradation studies, composition E was applied to a glass plate and passed under the UV lamp as described in example 2. The resulting polymers were dissolved in THF and cast onto glass cover slips. The solvent was allowed to evaporate and the samples were subsequently dried overnight at room temperature in vacuo. The samples were placed in 10 ml of PBS containing proteinase K, an enzyme that is known to degrade ester bonds (M. S. Reeve, S. P. McCarthy, M. J. Downey, R. A. Gross, *Macromolecules* 1994, 27, 825-831).

The solutions were refreshed every 2-3 days and the pH of the replaced buffer solution was measured (FIG. 8). The weight loss of the samples and the average molecular weight of the polymers were monitored as a measure for degradation (FIG. 12 and Table 12).

The sample exhibited a weight loss after 4 days (the first data point), which is probably again due to the dissolution of low molecular weight water-soluble material (FIG. 12 and Table 12). The enzymatic degradation initially proceeded faster than the hydrolytic degradation, as after 11 days, 30% of the weight was lost compared to 15% for the hydrolytically degraded polymer. The highest delta pH was observed after 20 days (FIG. 11).

SEC showed clearly that the average molecular weight had decreased after 6 days. The next two data points at 11 and 18 days clearly showed a further decrease in the average molecular weight with degradation time. Moreover, the polydispersity index (PDI) of the polymers decreased (from 4) to approximately 2.

¹H-NMR clearly showed a gradual decrease in the lactic ester and glycolic ester resonances over time compared to the other resonances indicating that degradation primarily occurred at the lactic esters and glycolic esters. The additional resonances at 5.5 ppm, 3.9 ppm observed for the hydrolytic degradation were not observed for the enzymatic degradation, whereas the additional resonance at 1.4 ppm was observed and found to increase with degradation time. Furthermore a resonance at 4.2 was observed to increase with degradation time, which is most likely from the —(C═O)CH₂OH and —(C═O)CH(CH₃)OH protons obtained through the hydrolysis of glycolic and lactic esters confirming that hydrolysis primarily occurred at the glycolic and lactic esters linkages. After 30 days the sample had lost 90% of its weight. This experiment shows that the polymerised composition E degraded in a buffer with a physiological salt concentration at 37° C. and in the presence of proteinase K.

TABLE 12

SEC data of linear polymers obtained after UV light induced polymerization of composition E during its degradation in the presence of proteinase K.

| t (days) | $M_n$ (×10$^3$ Da) | $M_w$ (×10$^3$ Da) | $M_z$ (×10$^3$ Da) | PDI |
|---|---|---|---|---|
| 0 | 4.8 | 18 | 53 | 3.85 |
| 4 | 6.7 | 30 | 104 | 4.42 |
| 6 | 7 | 26 | 82 | 3.71 |
| 11 | 4.8 | 11 | 23 | 2.26 |
| 18 | 4.7 | 8.9 | 17 | 1.86 |

Example 13

(Bio)Degradation of Crosslinked Networks Comprising Thioester Bonds

To investigate the (bio)degradation characteristics of crosslinked networks comprising thioester bonds, UV-crosslinked samples based on composition I may be degraded both enzymatically as well as hydrolytically. To this end, composition I is applied onto microscope slides, which are previously weighed, and passed 8 times under the UV-lamp to obtain a crosslinked sample. The solvent is allowed to evaporate and the samples are subsequently dried in vacuo. The samples are placed in either 10 ml of PBS or in 10 ml of PBS containing proteinase K. The solutions are refreshed every 2-3 days and the pH of the buffer replaced and the weight loss of the samples are monitored as a measure of degradation.

Example 14

Testing the Cytotoxicity of Crosslinked Networks Comprising Thioester Bonds

Composition I was applied onto glass microscope slides using a 50 μm doctor blade and passed 8 times under the UV-lamp. Some of the glass microscope slides containing the sample were submerged in chloroform to extract any low molecular weight organic compounds and submitted for cytotoxicity tests. The rest of the glass slides containing the samples were also submitted for cytotoxicity tests. All samples proved to be non-cytotoxic (Grade 0). These results confirmed the total absence of water-soluble cytotoxic components. This also shows that the samples are a good candidate to be safely applied in situ in a (human) body. It also shows that the necessity to wash the samples with a solvent before applying may be obviated by the present invention.

The invention claimed is:

1. Method of making a polymer comprising at least two thioester bonds via an addition reaction, said method comprising the steps of:
    a. forming a composition by admixing a component X comprising at least one ethylenically unsaturated group with a component Y comprising at least two thioic acid group, wherein X and/or Y is an oligomer or a polymer and
    b. allowing the components to form at least two thioester bonds.

2. A method according to claim 1 wherein said components X and/or Y are degradable, preferably biodegradable, even more preferably metabolizable.

3. A method according to claim 1 wherein said components X and Y are both oligomers or polymers.

4. A method according to claim 1 wherein said component Y is dithio adipic acid.

5. A method according to claim 1 wherein said polymerization is induced by light such as UV or visible light and/or heat, such as body heat or ambient temperature.

6. A method according to claim 1 wherein a photoinitiator or thermal initiator or catalyst is present in said composition.

7. A method according to claim 1 wherein said component X comprises at least 2 ethylenically unsaturated groups.

8. A method according to claim 1 wherein said component Y comprises at least 3 thioic acid groups.

9. A method according to claim 1 wherein crosslinked polymers or networks are formed and wherein the average number of functional groups per molecule has a minimum of 1.2.

10. A method according to claim 1 wherein components X and Y, apart from the ethylenically unsaturated groups and thioic acid groups, are chemically distinct entities.

* * * * *